US007293593B2

(12) United States Patent
Schiebout

(10) Patent No.: US 7,293,593 B2
(45) Date of Patent: Nov. 13, 2007

(54) ISLAND PLACEMENT TECHNOLOGY

(75) Inventor: David Schiebout, Blaine, MN (US)

(73) Assignee: Delta Industrial Services, In., Minneapolis, MN (US)

( * ) Notice: Subject to any disclaimer, the term of this patent is extended or adjusted under 35 U.S.C. 154(b) by 19 days.

(21) Appl. No.: 11/172,281

(22) Filed: Jun. 30, 2005

(65) Prior Publication Data

US 2006/0000555 A1 Jan. 5, 2006

Related U.S. Application Data

(60) Provisional application No. 60/584,276, filed on Jun. 30, 2004.

(51) Int. Cl.
*B32B 38/04* (2006.01)
*B32B 37/00* (2006.01)

(52) U.S. Cl. ....................... 156/519; 156/520; 156/552

(58) Field of Classification Search ................ 156/541, 156/265, 519, 552, 553
See application file for complete search history.

(56) References Cited

U.S. PATENT DOCUMENTS 2,291,841 A * 8/1942 Staude ....................... 493/346
2,958,437 A 11/1960 Mengis
3,012,481 A 12/1961 Hughes
3,616,027 A 10/1971 Honsel
3,728,191 A 4/1973 Wierzba et al.
3,850,724 A 11/1974 Lehmacher et al.
3,879,246 A * 4/1975 Walker ....................... 156/265
3,933,564 A 1/1976 Jensen
3,960,646 A 6/1976 Wiedamann
4,001,072 A 1/1977 deNeul
4,061,527 A 12/1977 Traise
4,217,164 A 8/1980 La Mers
4,332,635 A 6/1982 Holbrook et al.
4,475,969 A 10/1984 Reed
4,488,922 A 12/1984 Instance
4,533,586 A 8/1985 Roule et al.
4,642,085 A 2/1987 Helm
4,650,537 A 3/1987 Perecman
4,701,239 A 10/1987 Craig
4,726,865 A 2/1988 Treat
4,765,118 A * 8/1988 Akutsu et al. ............. 53/133.5
4,795,510 A 1/1989 Wittrock et al.
4,980,979 A 1/1991 Wedel
5,031,338 A 7/1991 Wedel
5,235,515 A * 8/1993 Ungpiyakul et al. ........ 700/125
5,256,239 A 10/1993 Voltmer et al.
5,286,543 A 2/1994 Ungpiyakul et al.
5,296,080 A * 3/1994 Merkatoris et al. ......... 156/496
5,324,153 A 6/1994 Chess
5,503,702 A 4/1996 Filicicchia et al.
5,587,043 A 12/1996 Hying et al.

(Continued)

*Primary Examiner*—Melvin Mayes
(74) *Attorney, Agent, or Firm*—Schwegman, Lundberg & Woessner P.A.

(57) ABSTRACT

A placement apparatus comprising an anvil roller, a die roller communicatively associated with the anvil roller, and a bump transfer roller communicatively associated with the vacuum roll. The invention also provides a process for placing articles on a web, comprising the steps of providing a stream of articles, placing the articles on the anvil roller, moving the anvil roller, moving an output web, and periodically bringing the output web into communicative association with the anvil roller whereby the articles are transferred to the output web at a predetermined distance from each other.

6 Claims, 32 Drawing Sheets

U.S. PATENT DOCUMENTS 5,674,345 A 10/1997 Nash
5,716,478 A 2/1998 Boothe et al.
5,720,223 A * 2/1998 Meschi ........................ 101/227
5,730,818 A 3/1998 Isakson
5,746,869 A * 5/1998 Hayden et al. ............. 156/265
5,759,340 A 6/1998 Boothe et al.
5,766,406 A * 6/1998 Bohn et al. .................. 156/362
5,776,284 A 7/1998 Sykes et al.
5,850,771 A 12/1998 Killian
5,915,613 A 6/1999 Meschenmoser
6,022,443 A 2/2000 Rajala et al.
6,047,642 A * 4/2000 Hunkeler .................... 101/483
6,071,333 A 6/2000 Breton et al.
6,187,128 B1 2/2001 Oosterlinck
6,319,347 B1 11/2001 Rajala et al.
6,450,321 B1 9/2002 Blumenthal et al.
6,475,325 B1 11/2002 Parrish et al.
6,494,244 B2 12/2002 Parrish et al.
6,524,423 B1 2/2003 Hilt et al.
6,550,517 B1 * 4/2003 Hilt et al. ................... 156/557
6,634,269 B2 10/2003 Eckstein et al.
6,649,010 B2 11/2003 Parrish et al.
6,705,453 B2 3/2004 Blumenthal et al.
6,722,413 B1 * 4/2004 Koehler et al. ............. 156/519
6,766,843 B2 7/2004 Hilt et al.
6,814,217 B2 11/2004 Blumenthal et al.
6,893,528 B2 5/2005 Middelstadt et al.
6,915,829 B2 7/2005 Popp et al.
2002/0038686 A1 4/2002 Parrish et al.
2002/0079045 A1 6/2002 Parrish et al.
2004/0122391 A1 6/2004 Franklin
2005/0230056 A1 10/2005 Meyer et al.

* cited by examiner

ISLAND PLACEMENT TECHNOLOGY

CROSS-REFERENCE TO RELATED APPLICATIONS, IF ANY

This application claims the benefit under 35 U.S.C. § 119(e) of now abandoned U.S. Provisional Patent Application Ser. No. 60/584,276, filed Jun. 30, 2004, which is hereby incorporated by reference

37 C.F.R. §1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to automated machine systems and methods, and products or articles produced thereby. Particularly, the invention relates to converting and packaging systems, methods and packaging produced thereby. Such equipment is typically used to package products for the medical, pharmaceutical, and electronics fields. Most particularly, the invention relates to and is useful for island placement systems, subsystems and processes, and webs produced thereby. The invention may be useful in other fields.

2. Background Information

The state of the art includes various converting and packaging systems and subsystems or modules, related processes, and related articles, for example webs, produced thereby.

This technology is believed to have significant limitations and shortcomings. For this and other reasons, a need exists for the present invention.

All U.S. patents and patent applications, and all other published documents mentioned anywhere in this application are incorporated by reference in their entirety.

BRIEF SUMMARY OF THE INVENTION

The invention provides a placement apparatus and method which are practical, reliable, accurate and efficient, and which are believed to fulfil the need and to constitute an improvement over the background technology.

Advantages and significant features of the invention include but are not necessarily limited to that plural webs can be combined, each having different line speeds. This is particularly useful with high value products such as RFID labels, medical epidermal electrodes, hydrogel products, and complex multi-layer labels, because the system minimizes waste web material.

In one aspect, the invention provides an article or island placement apparatus comprising an anvil roller, a die roller communicatively associated with the anvil roller, and a bump transfer roller communicatively associated with the anvil roller.

In another aspect, the invention provides a process for placing articles or islands on a web, comprising the steps of providing a stream of articles, placing the articles on the anvil roller, moving the anvil roller, moving an output web, and periodically bringing the output web into communicative association with the anvil roller whereby the articles are transferred to the output web at a predetermined distance from each other.

The features, benefits and objects of the invention will become clear to those skilled in the art by reference to the following description, claim(s), if any, and drawings.

DETAILED DESCRIPTION

Figure 1:
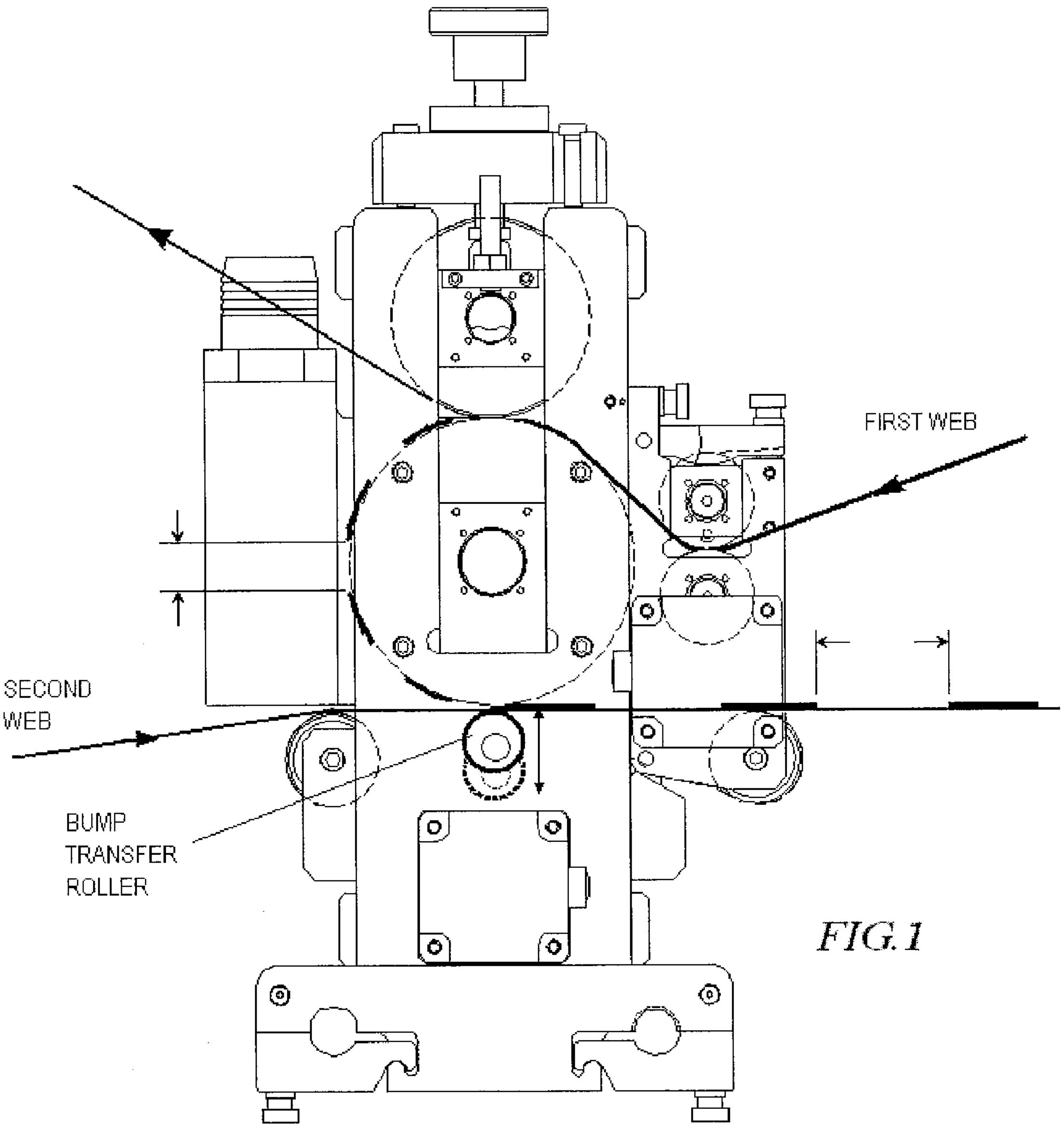
FIG. 1 is a diagram showing an embodiment of the operation of the island placement station system of the present invention.
Figure 2:
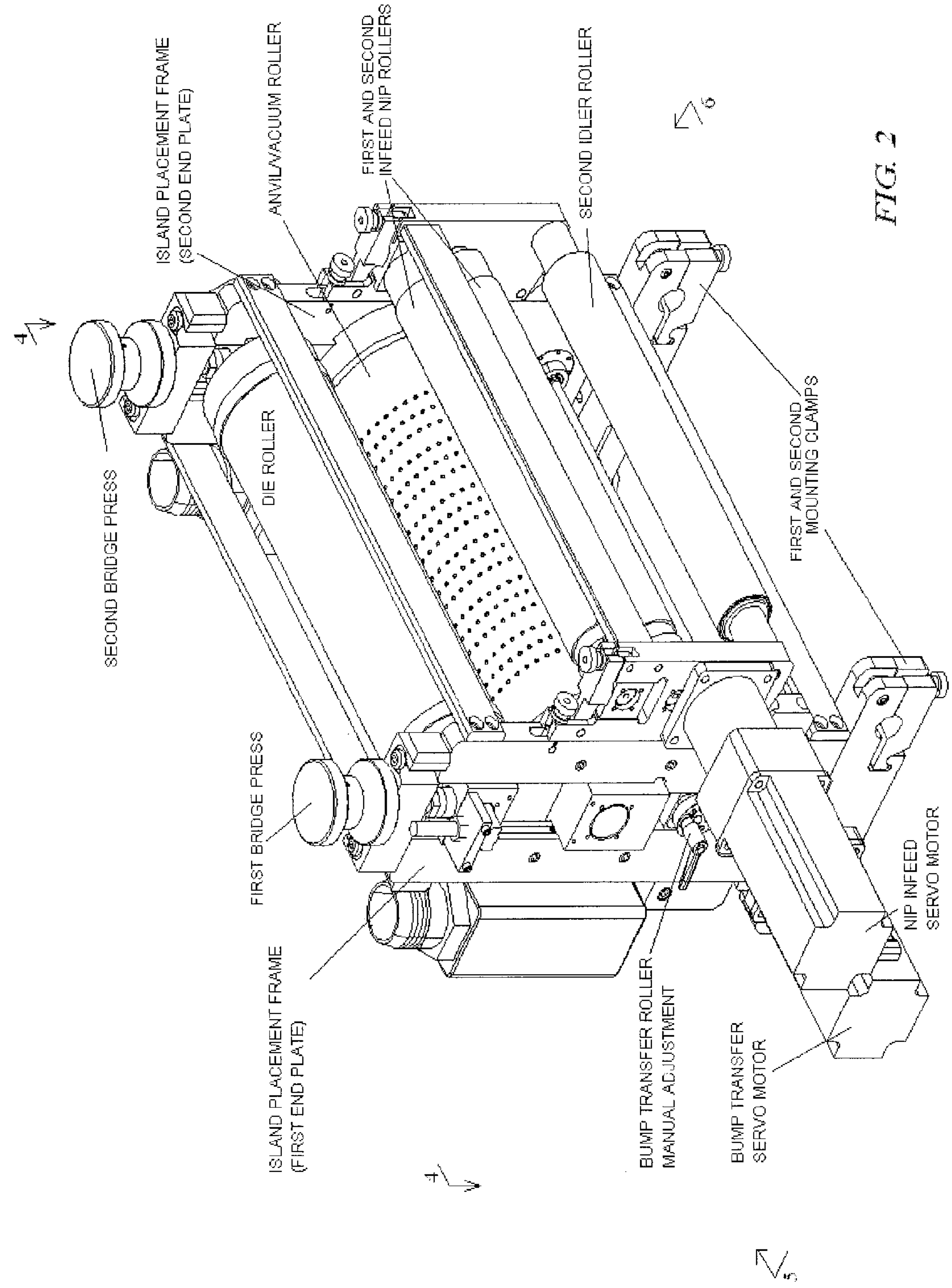
FIG. 2 is a perspective view of an embodiment of an island placement apparatus.
Figure 3:
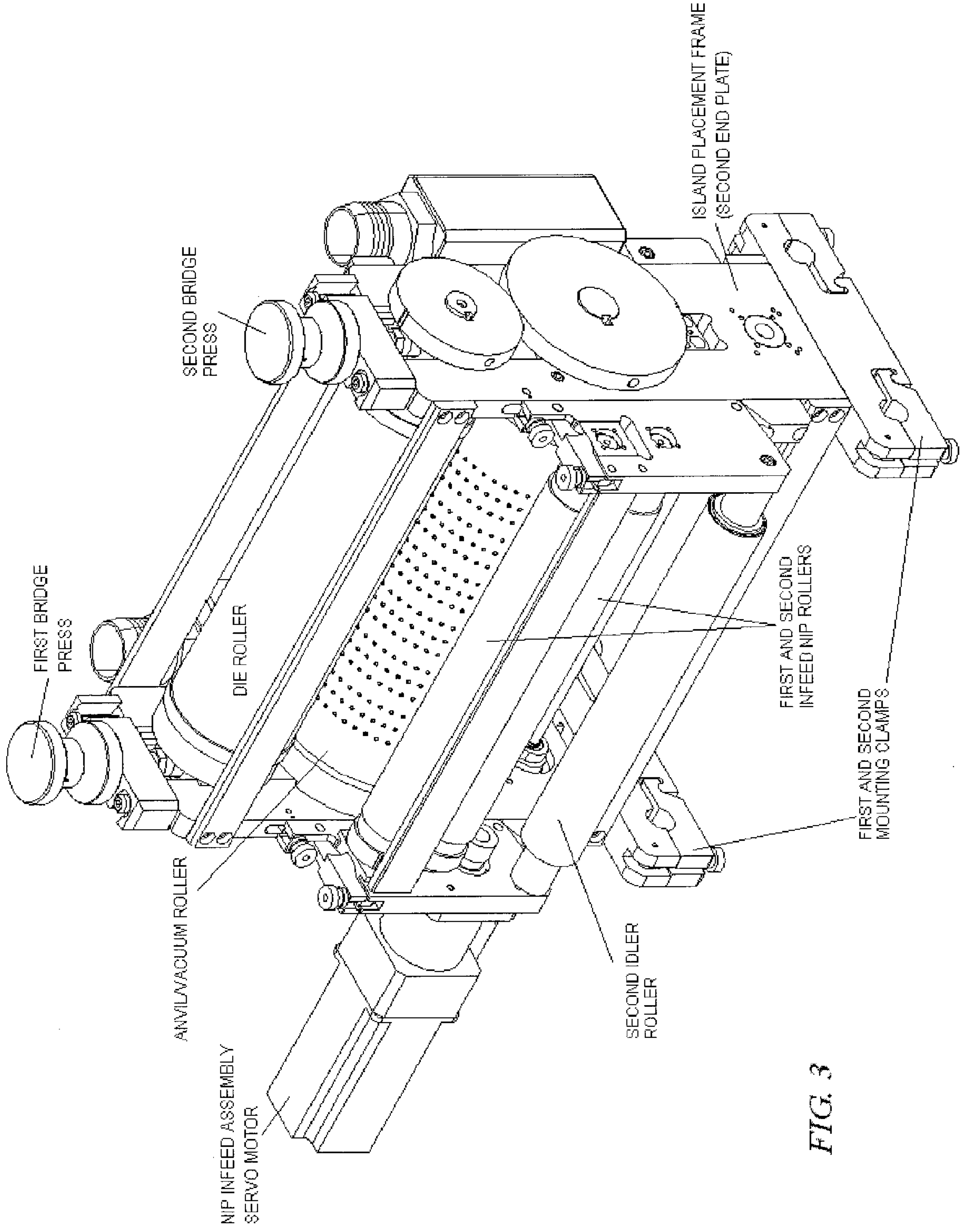
FIG. 3 is another perspective view of the island placement apparatus of FIG. 2.
Figure 4:
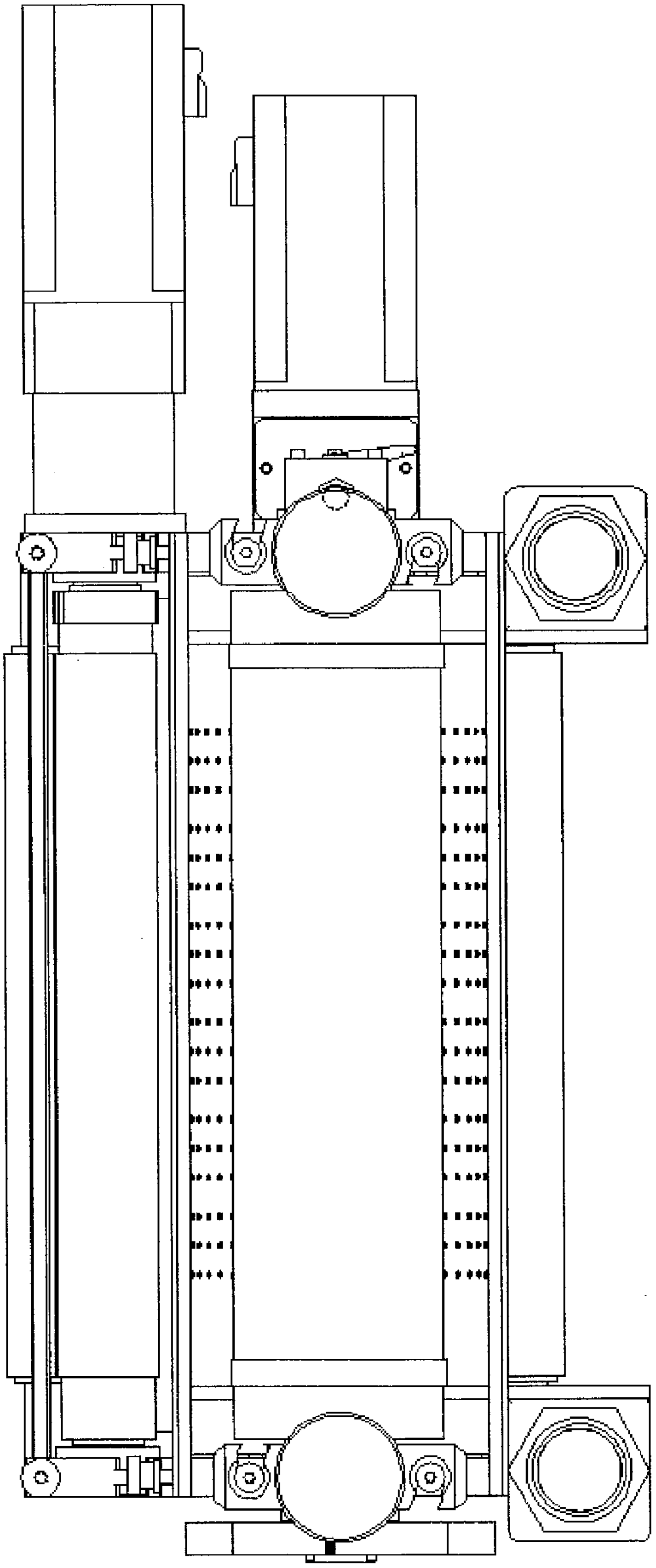
FIG. 4 is a top or plan view of the island placement apparatus of FIG. 2 taken along line 4-4.
Figure 5:
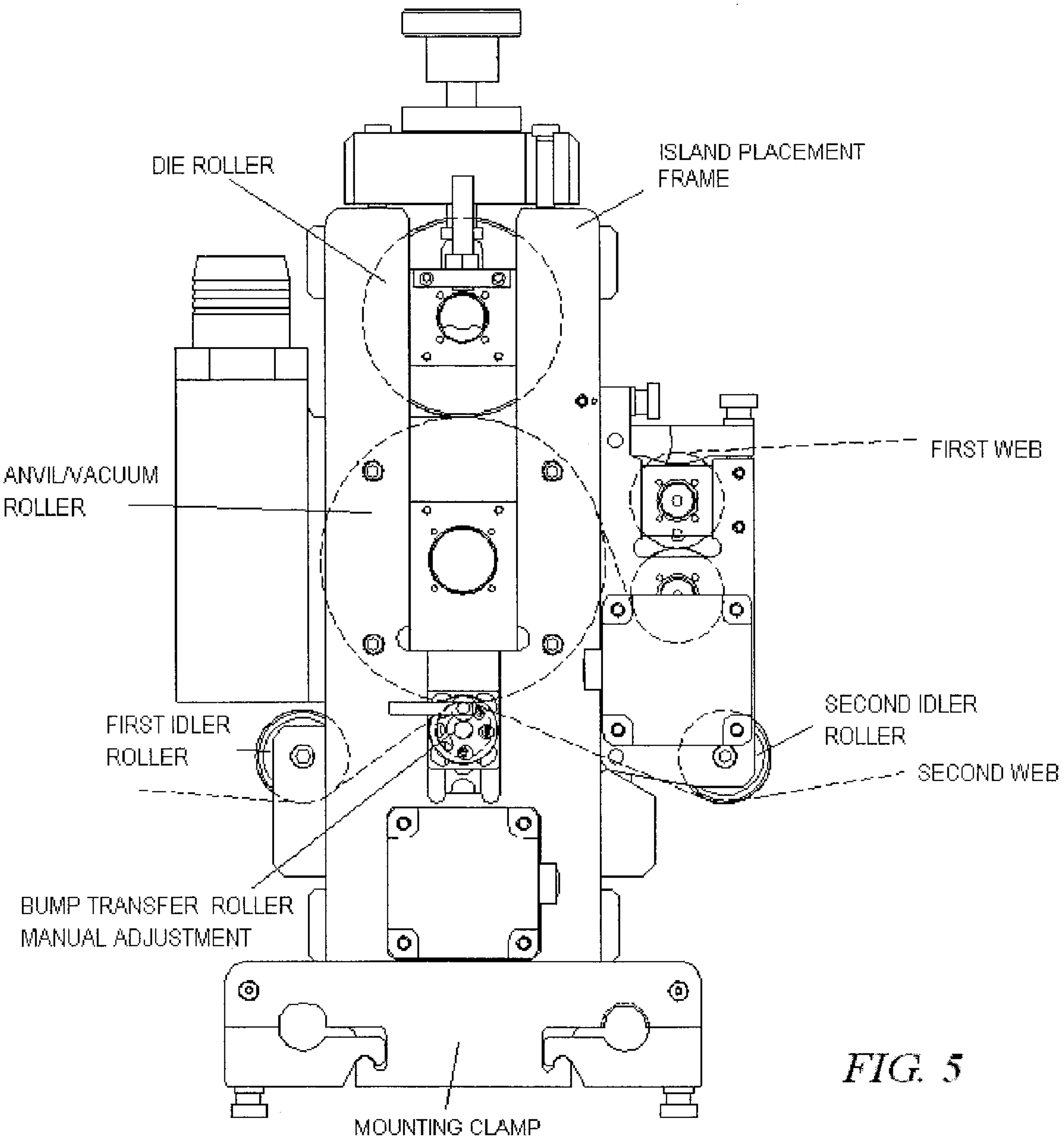
FIG. 5 is a side view of the island placement apparatus of FIG. 2 taken along line 5-5.
Figure 6:
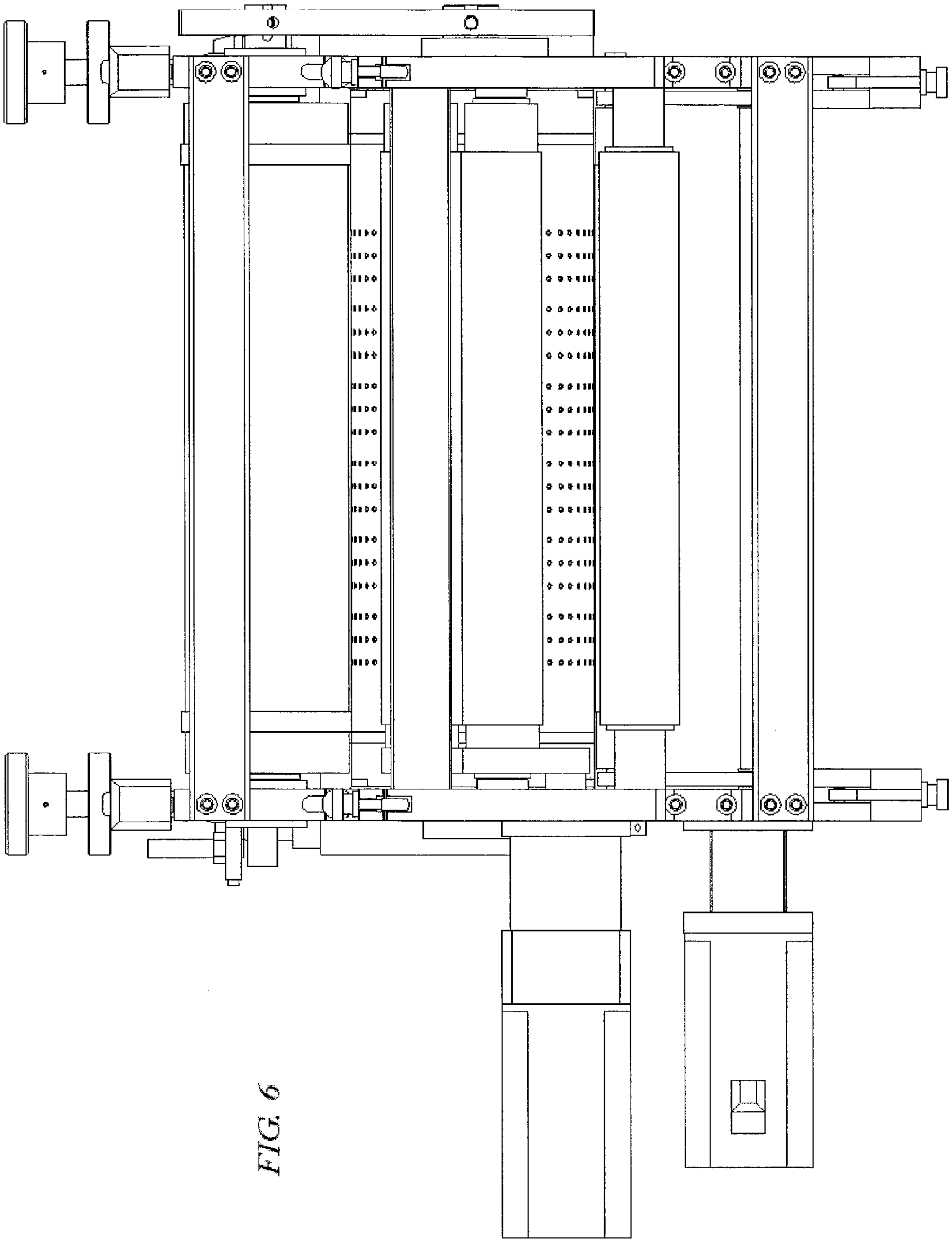
FIG. 6 is a front view of the island placement apparatus of FIG. 2 taken along line 6-6.
Figure 7:
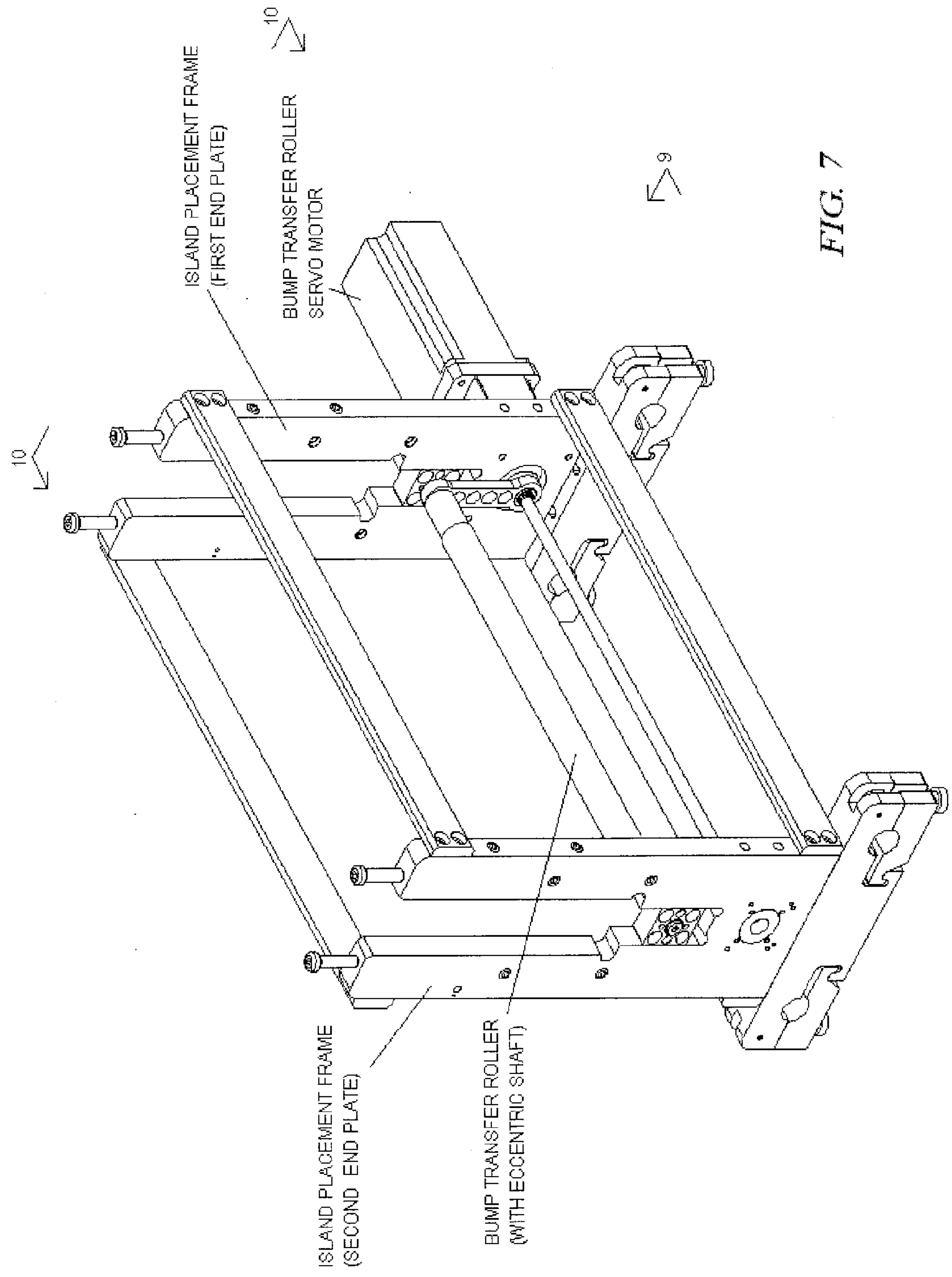
FIG. 7 is a perspective view of an embodiment of a cam station for use with the apparatus of FIG. 2.
Figure 8:
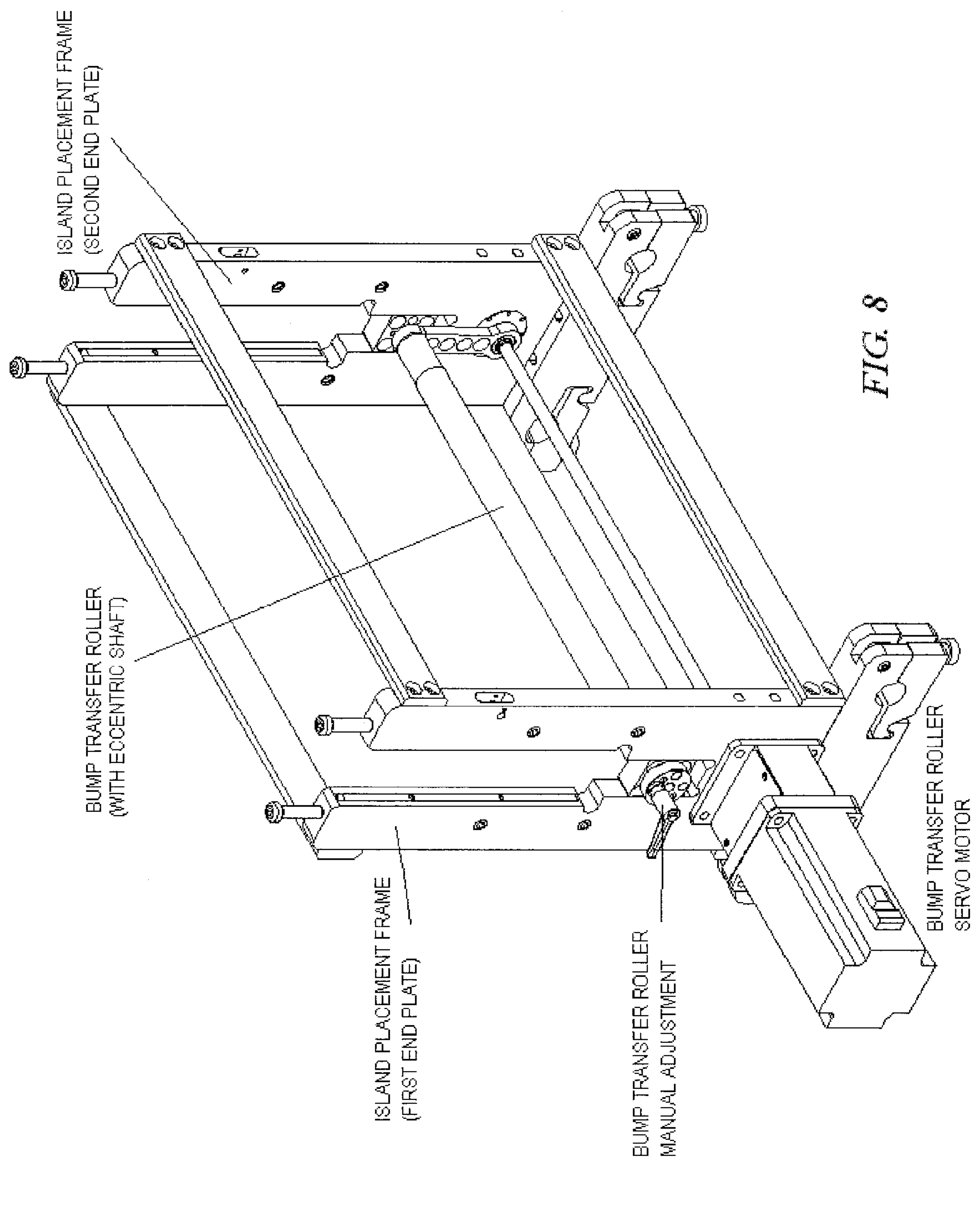
FIG. 8 is another perspective view of the cam station.
Figure 9:
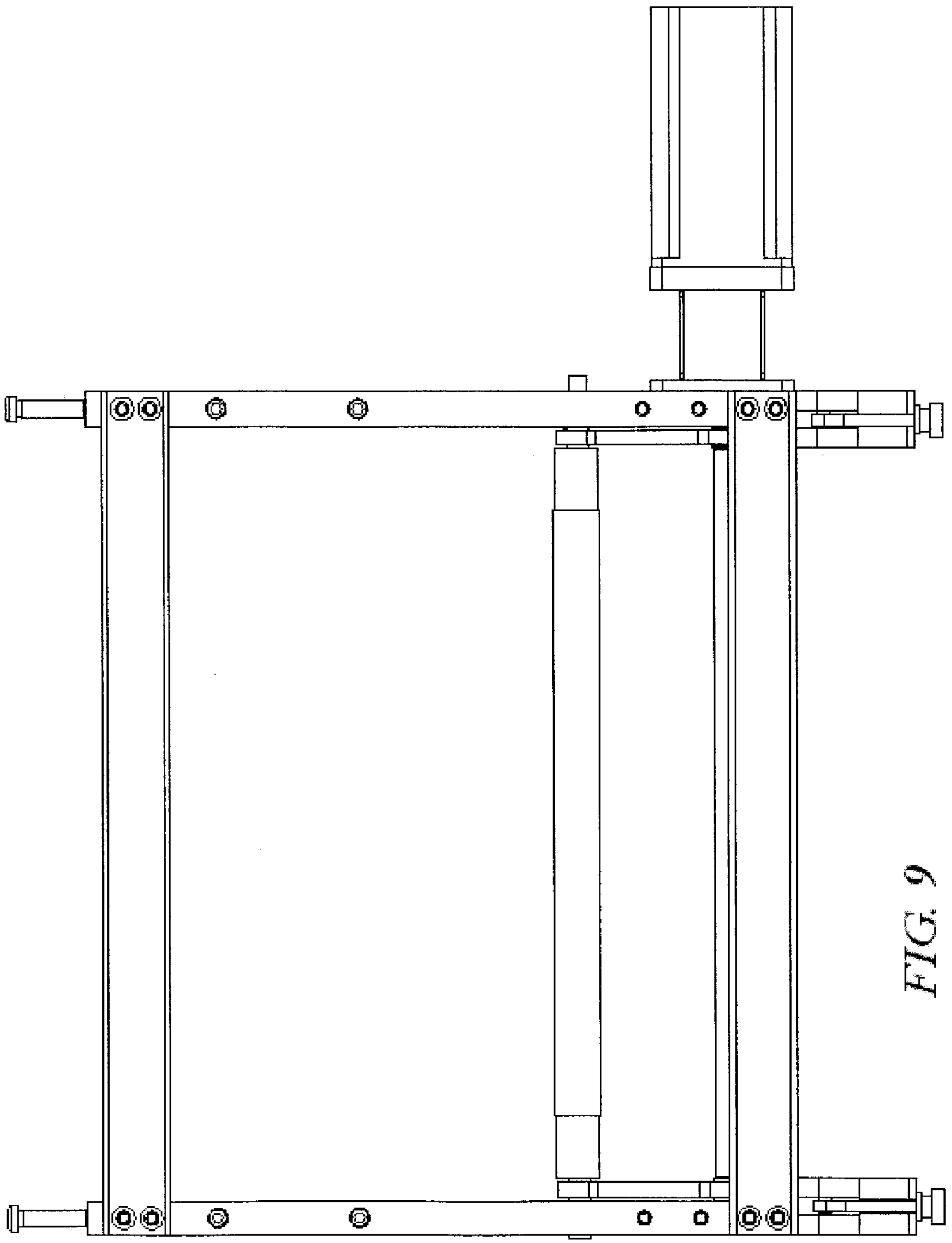
FIG. 9 is a front view of the cam station of FIG. 7 taken along lines 9-9.
Figure 10:
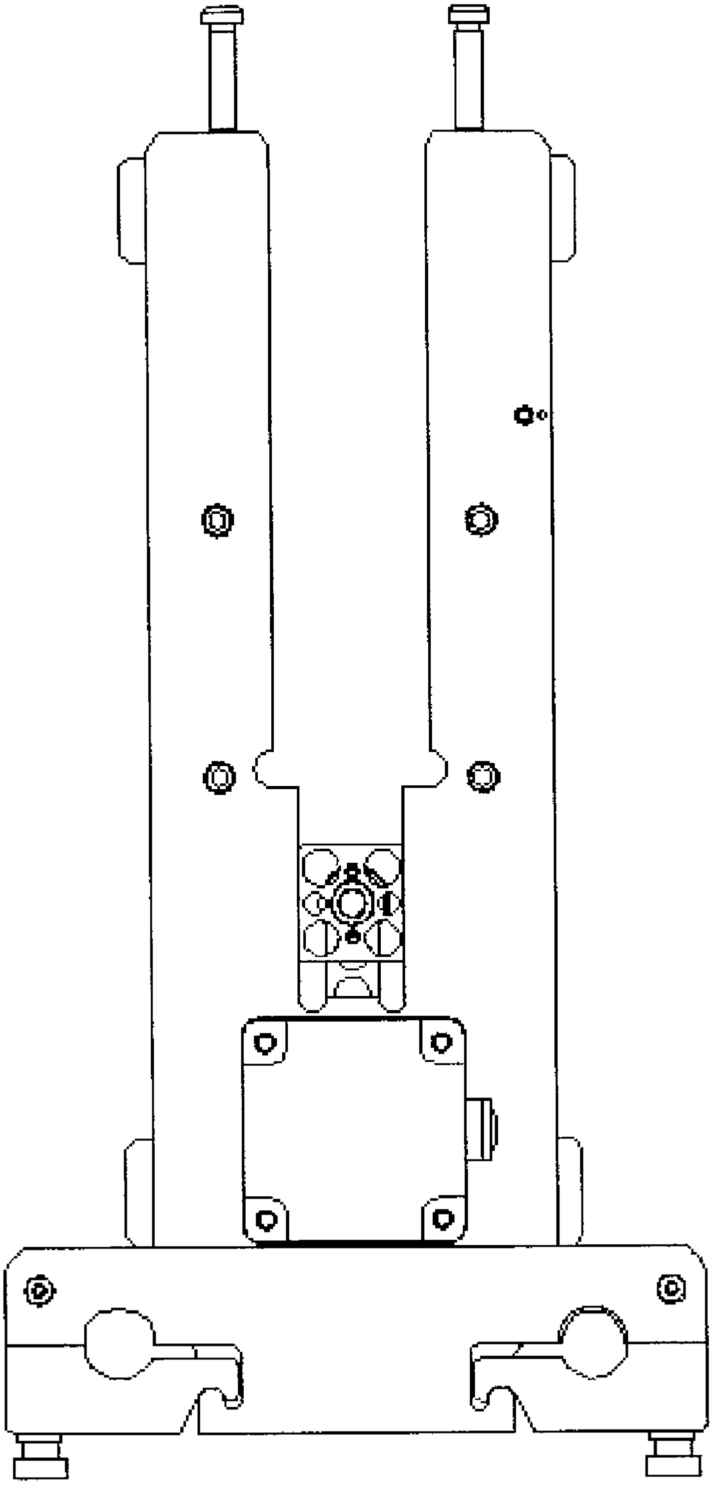
FIG. 10 is an end view of the earn station of FIG. 7 taken along line 10-10.
Figure 11:
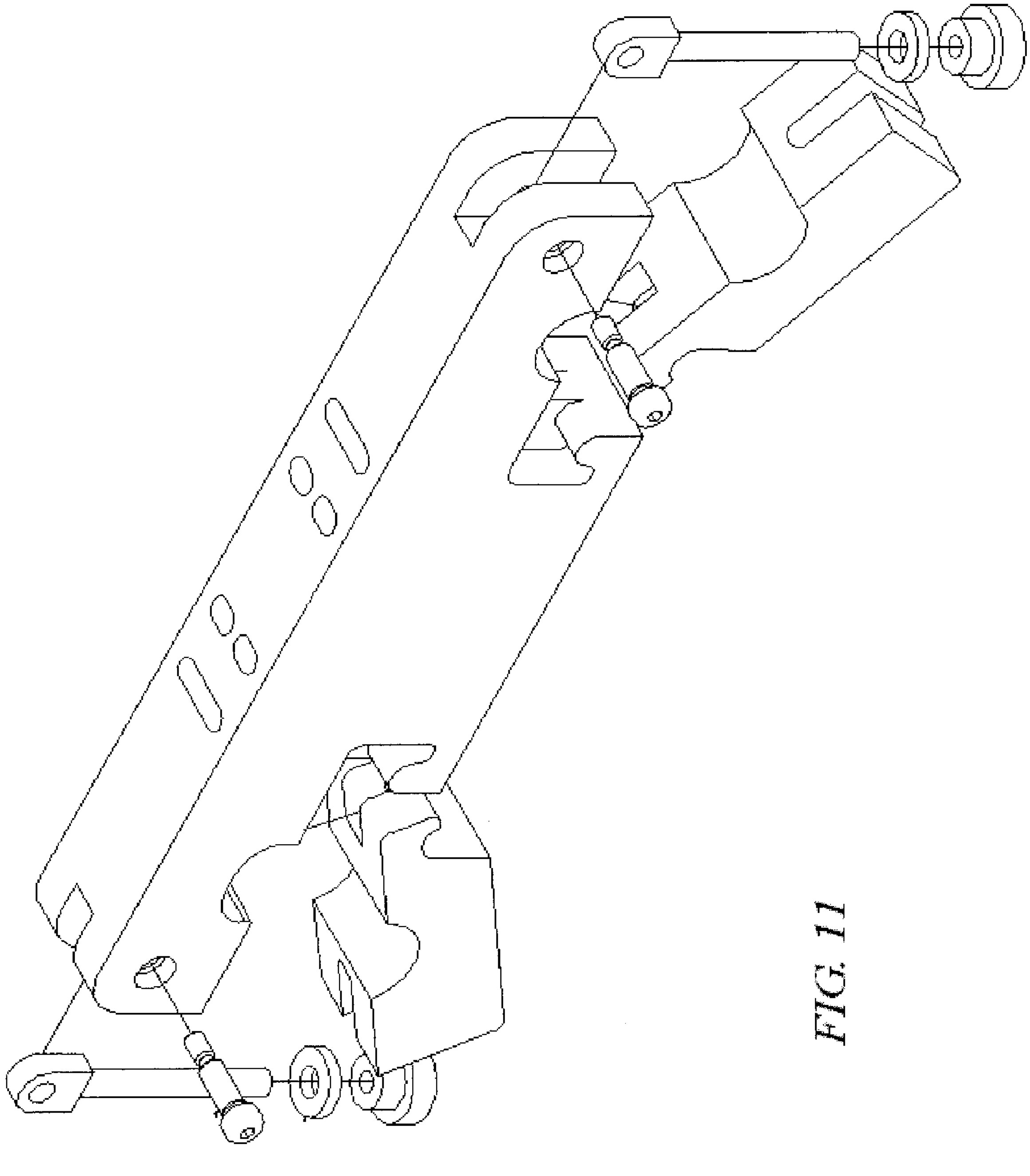
FIG. 11 is a perspective view of a mounting clamp for use with the apparatus of FIG. 2.
Figure 12:
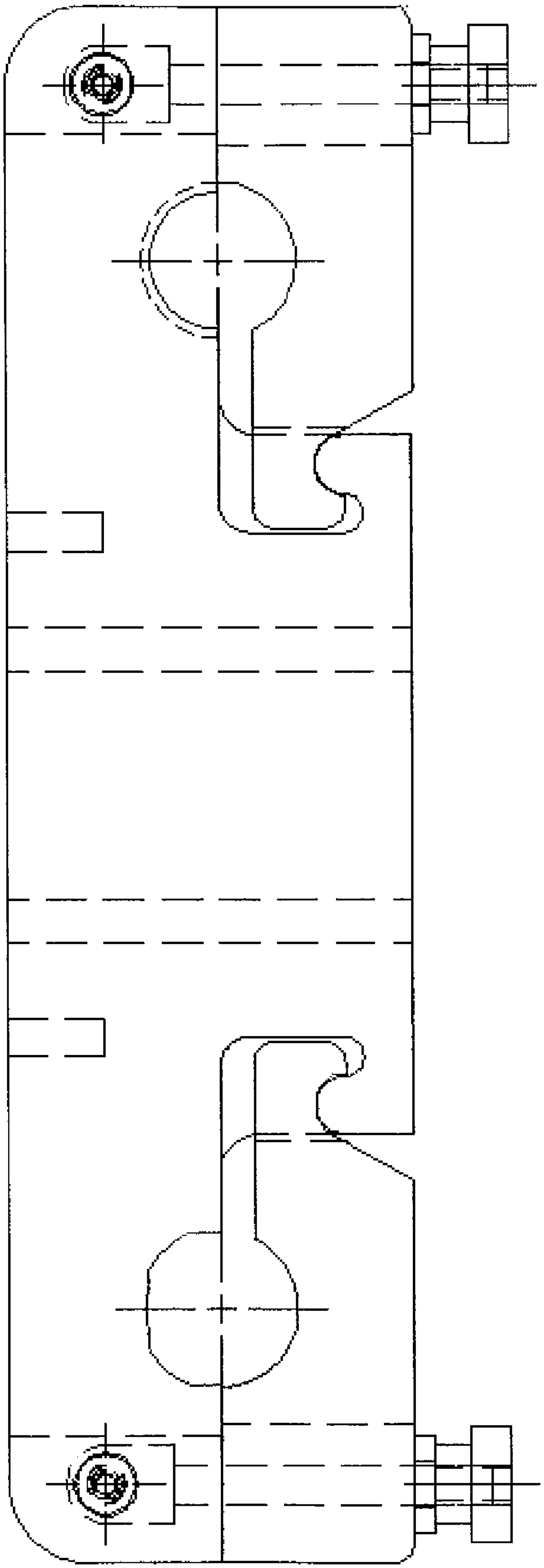
FIG. 12 is a front view of the mounting clamp.
Figure 13:
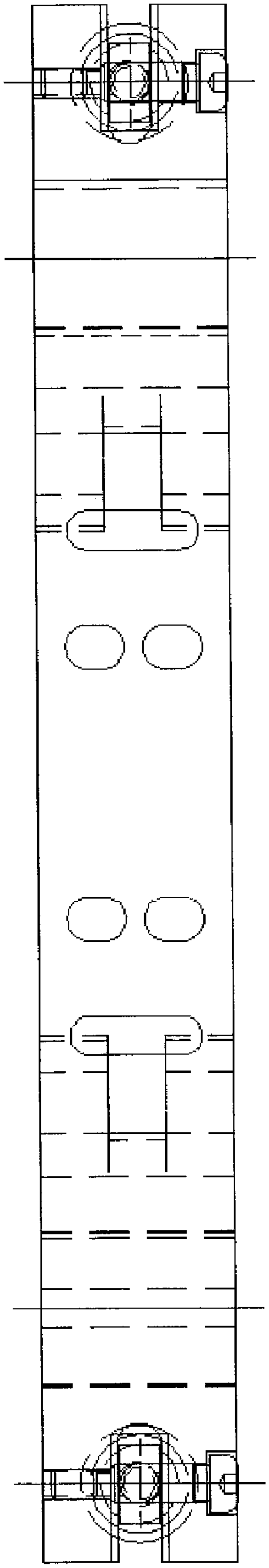
FIG. 13 is a top view of the mounting clamp.
Figure 14:
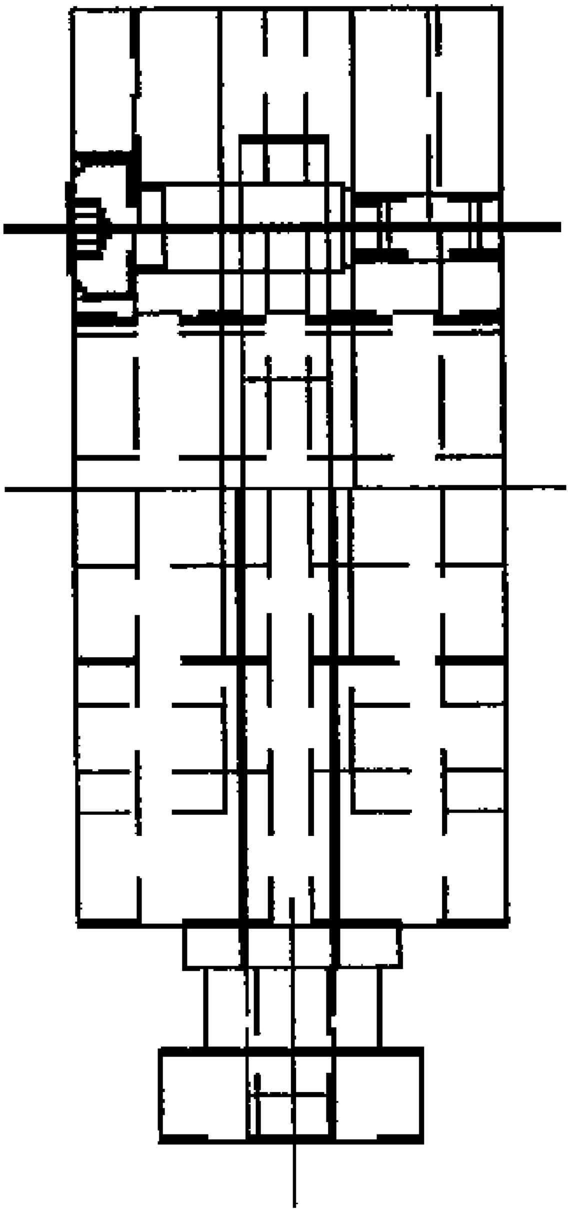
FIG. 14 is an end view of the mounting clamp.
Figure 15:
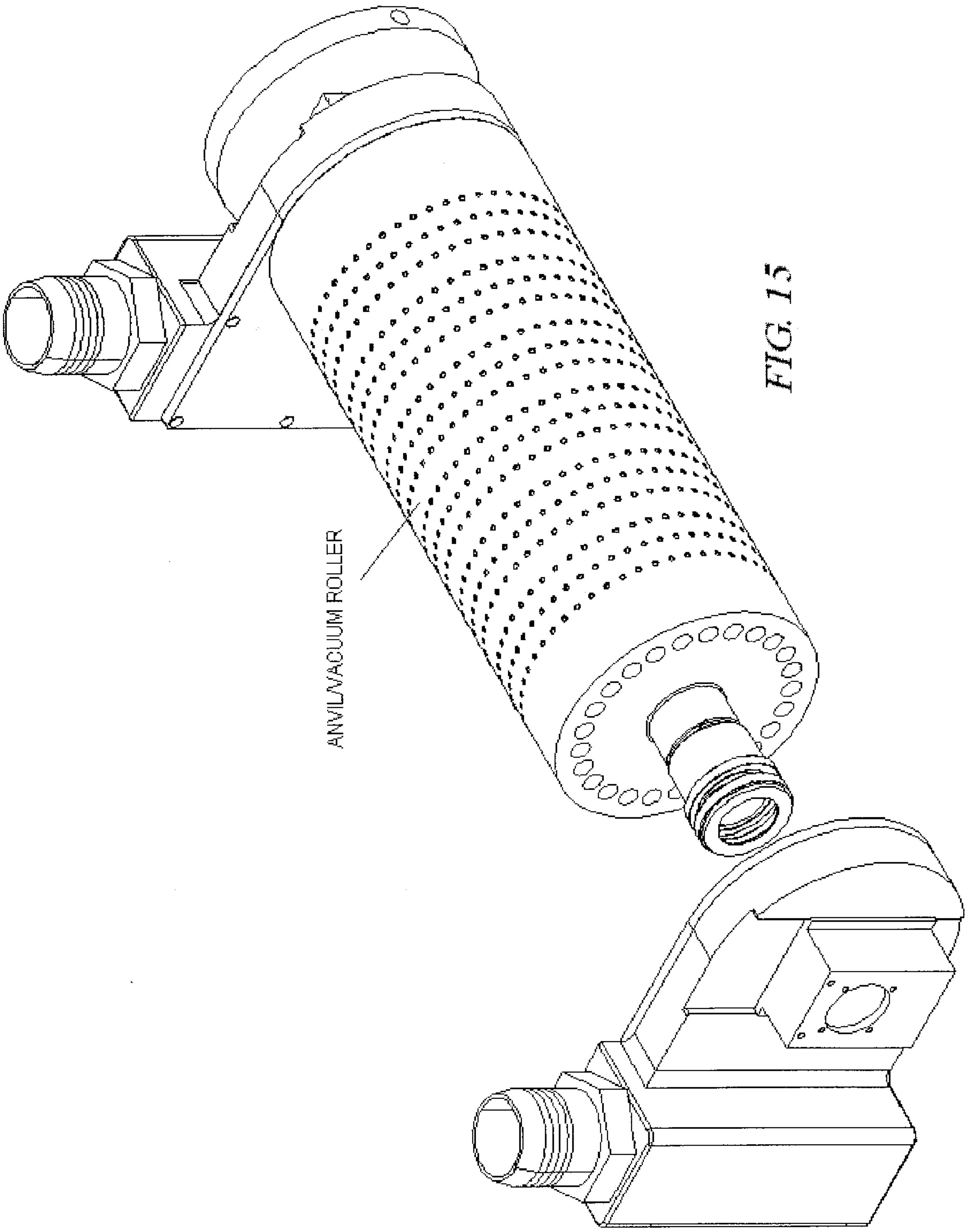
FIG. 15 is a perspective view of an embodiment of a vacuum roll used with the apparatus of FIG. 2.
Figure 16:
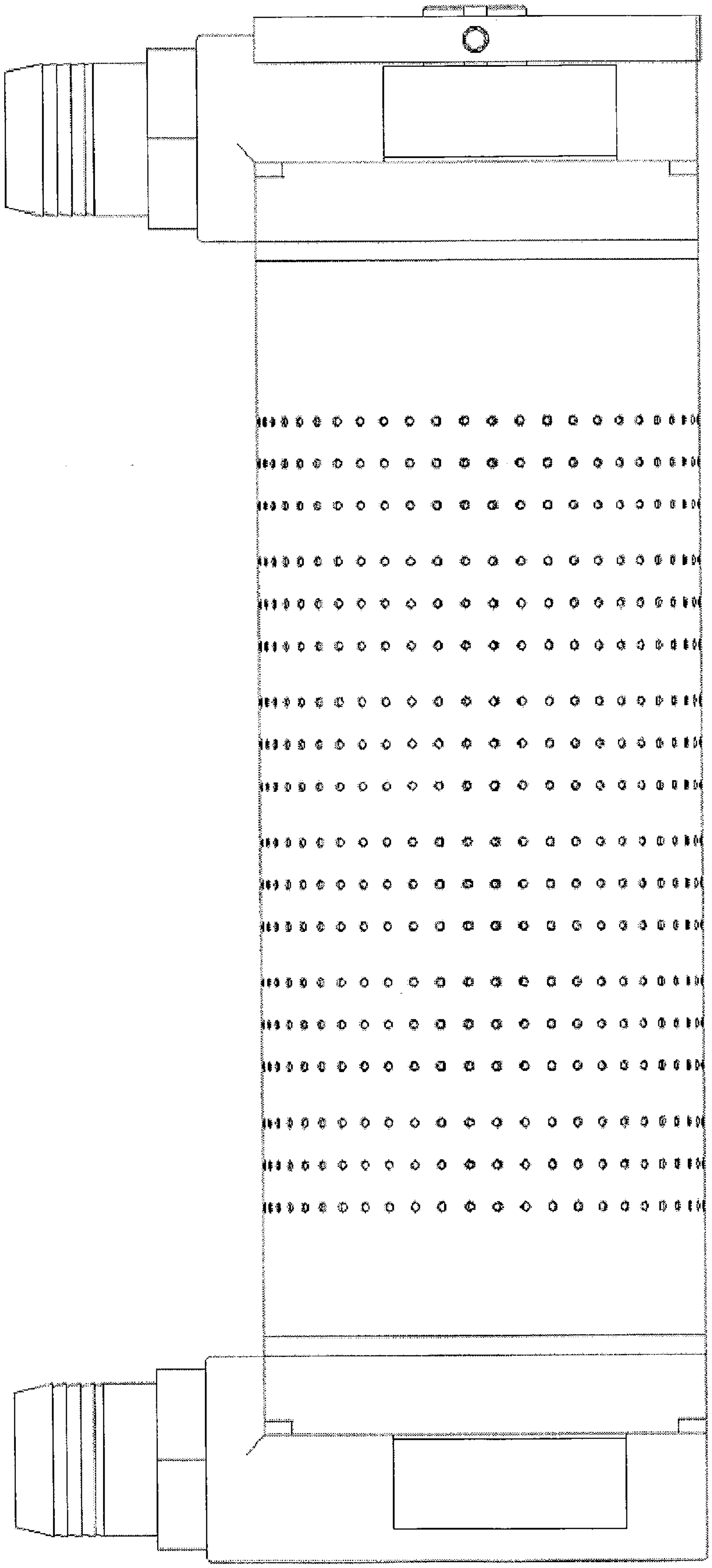
FIG. 16 is a front view of the vacuum roll.
Figure 17:
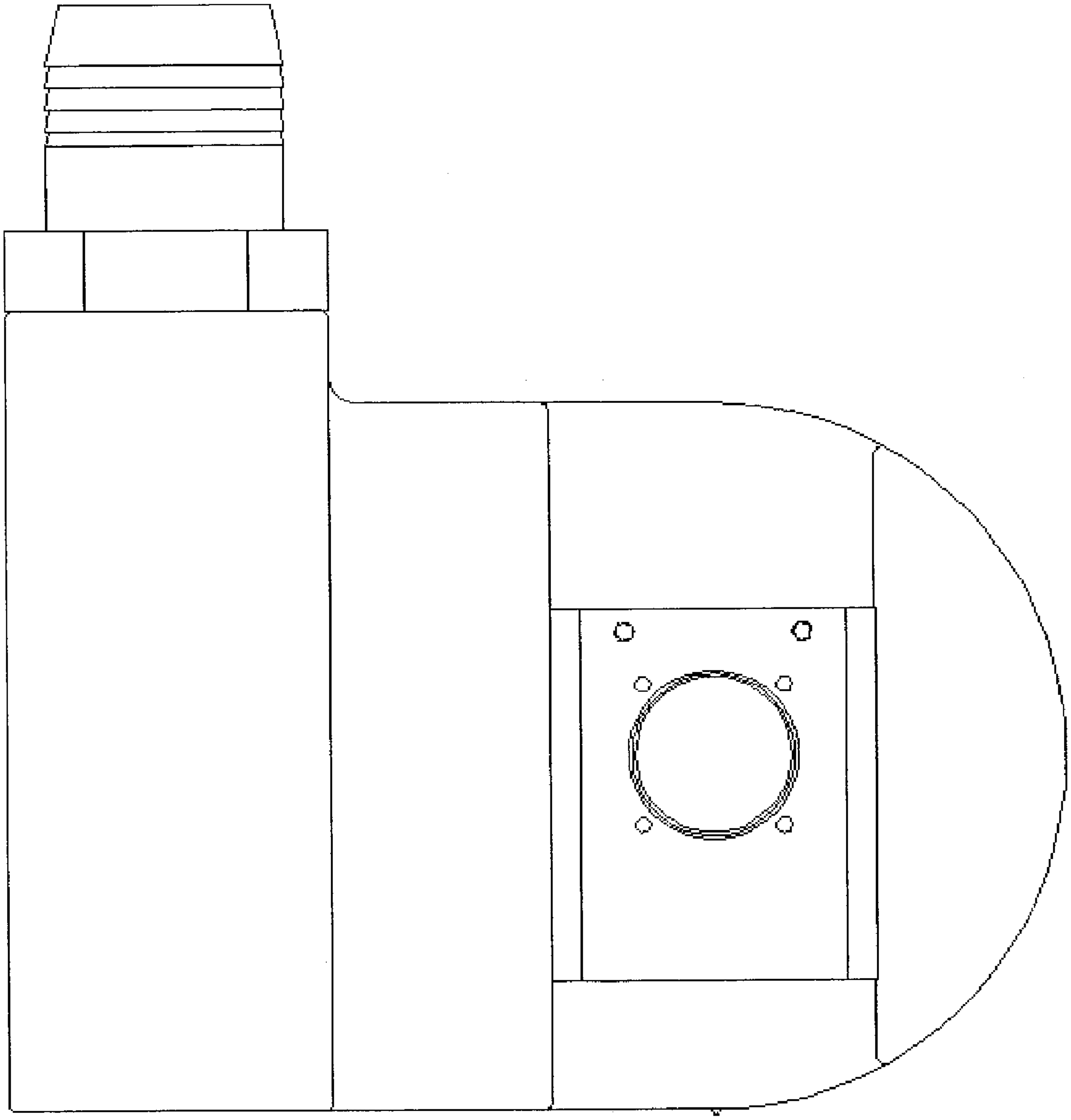
FIG. 17 is an end view of the vacuum roll.
Figure 18:
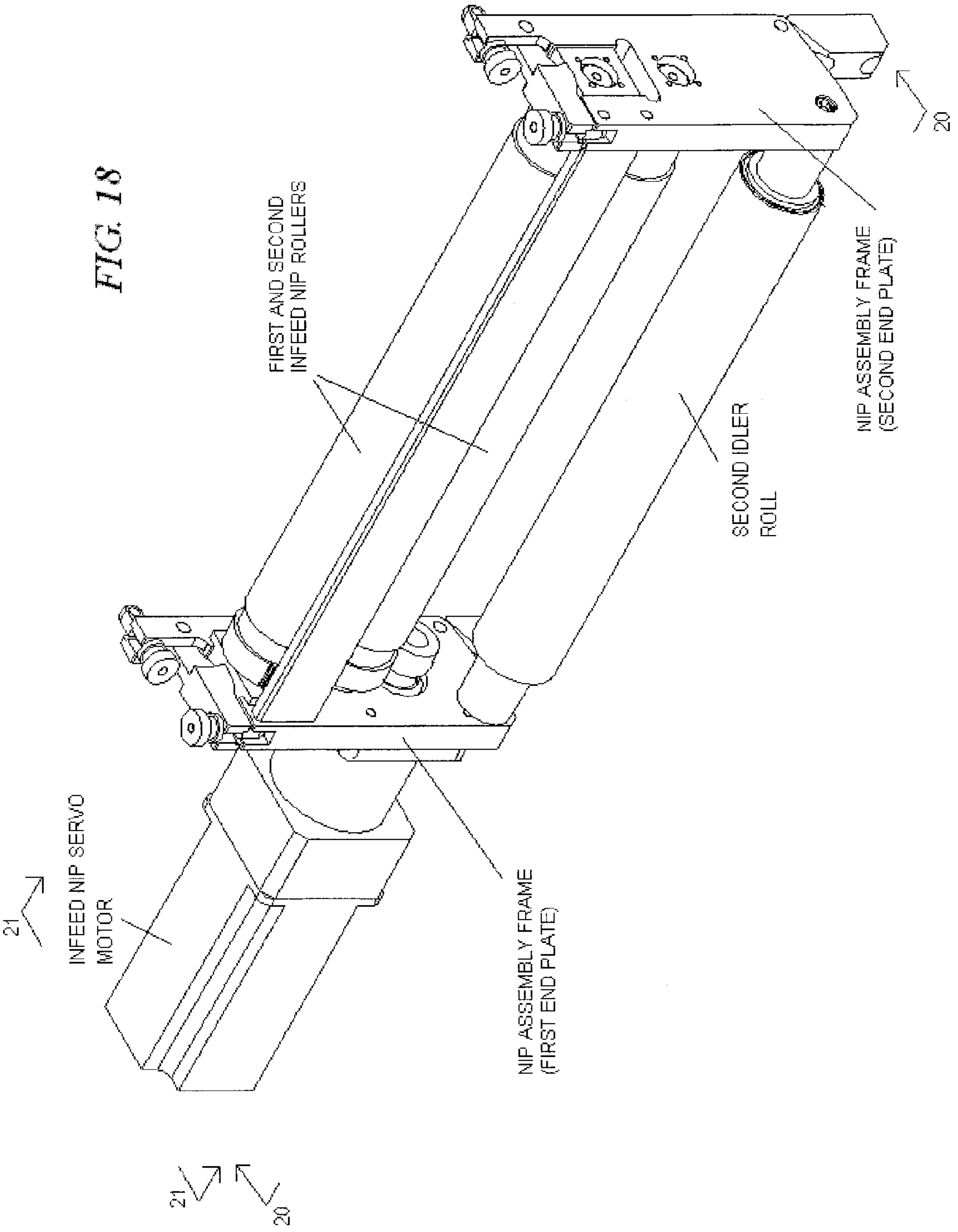
FIG. 18 is a perspective view of an embodiment of the nip infeed assembly of the apparatus used with the apparatus of FIG. 2.
Figure 19:
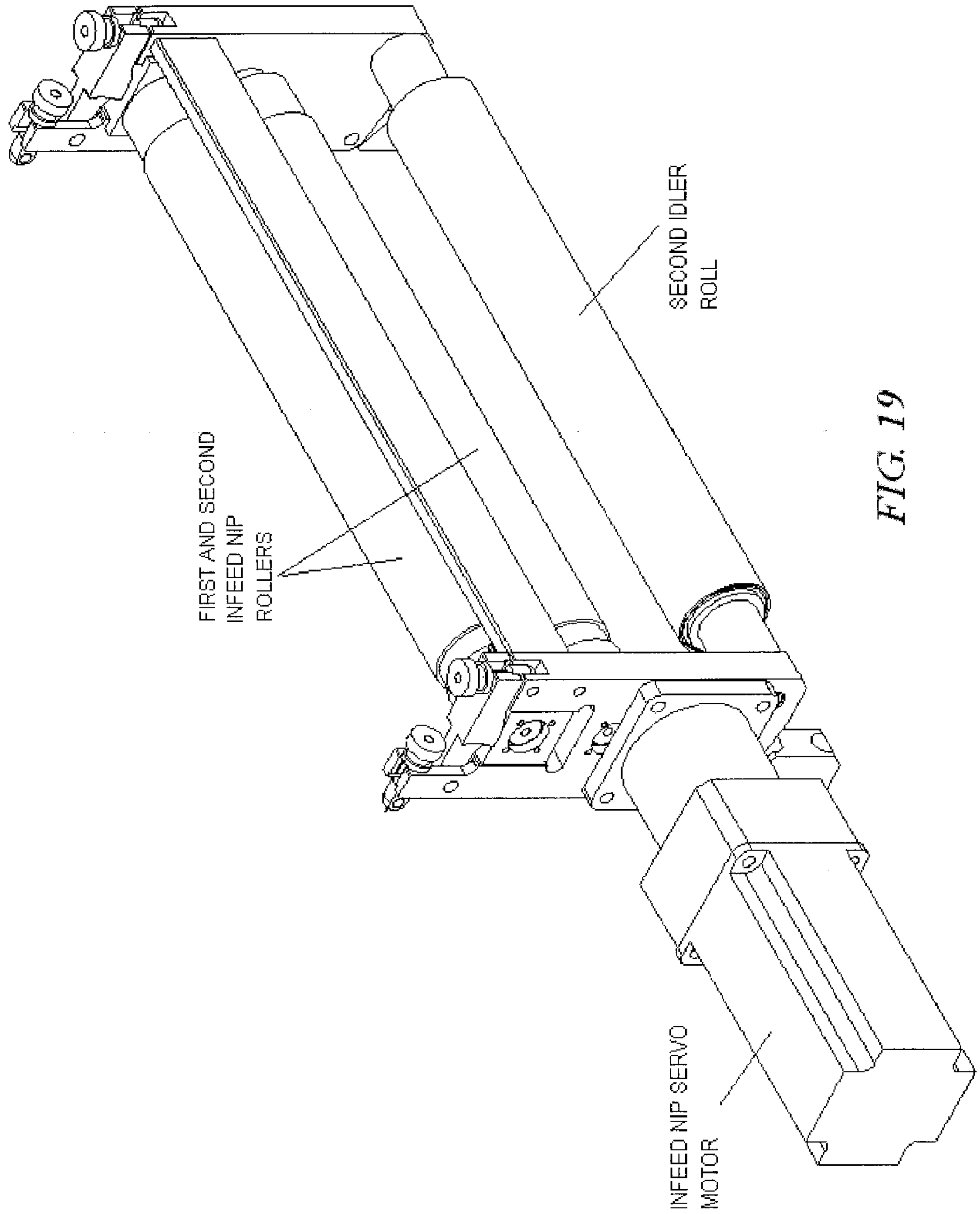
FIG. 19 is another perspective view of the nip infeed assembly.
Figure 20:
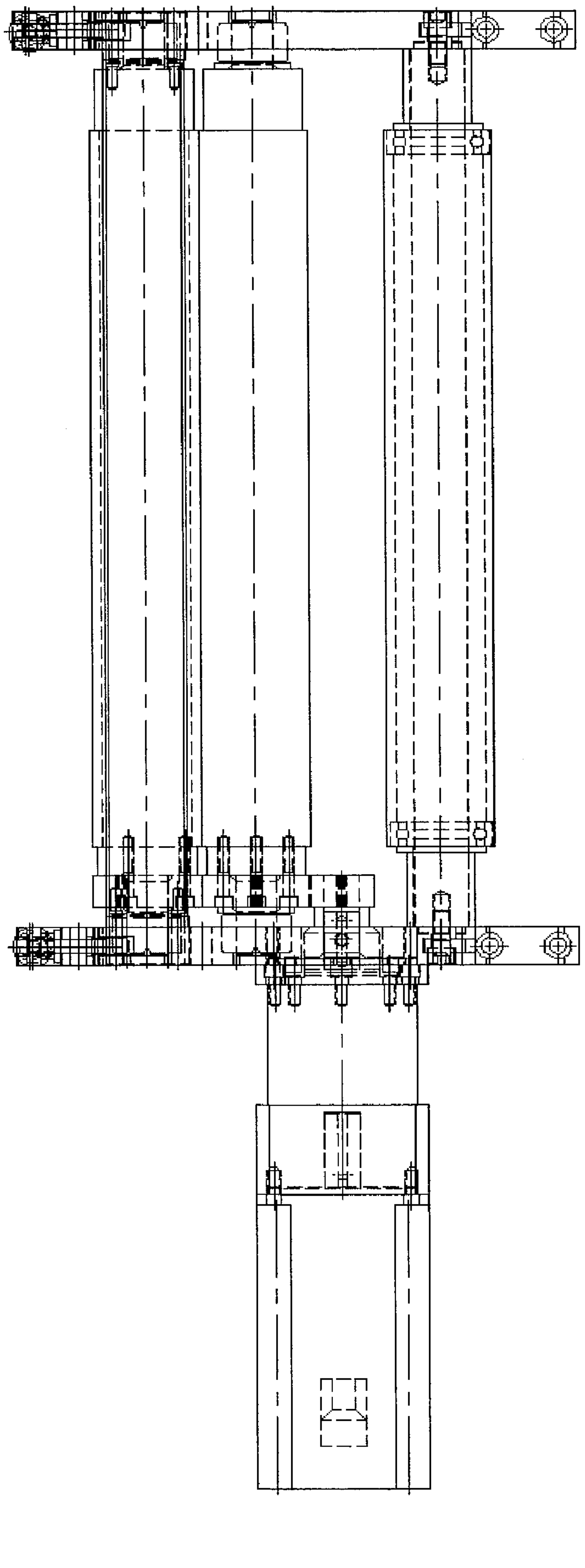
FIG. 20 is a front view of the nip infeed assembly of FIG. 18 taken along line 20-20.
Figure 21:
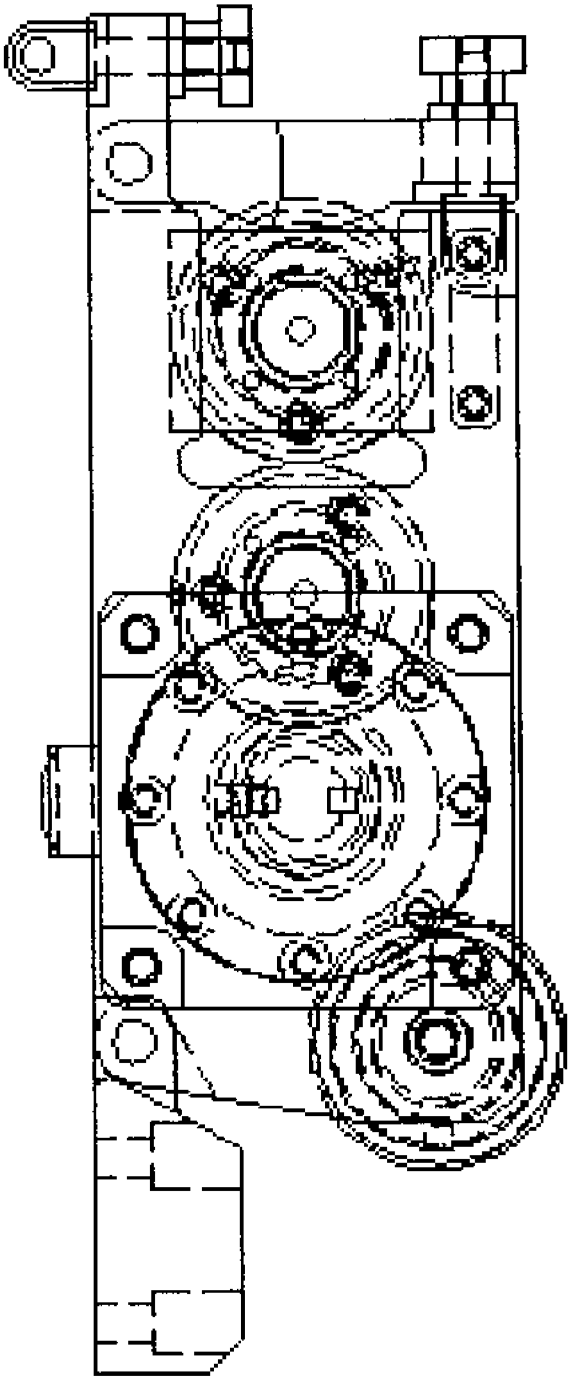
FIG. 21 is an end view of the nip infeed assembly of FIG. 18 taken along line 21-21.
Figure 22:
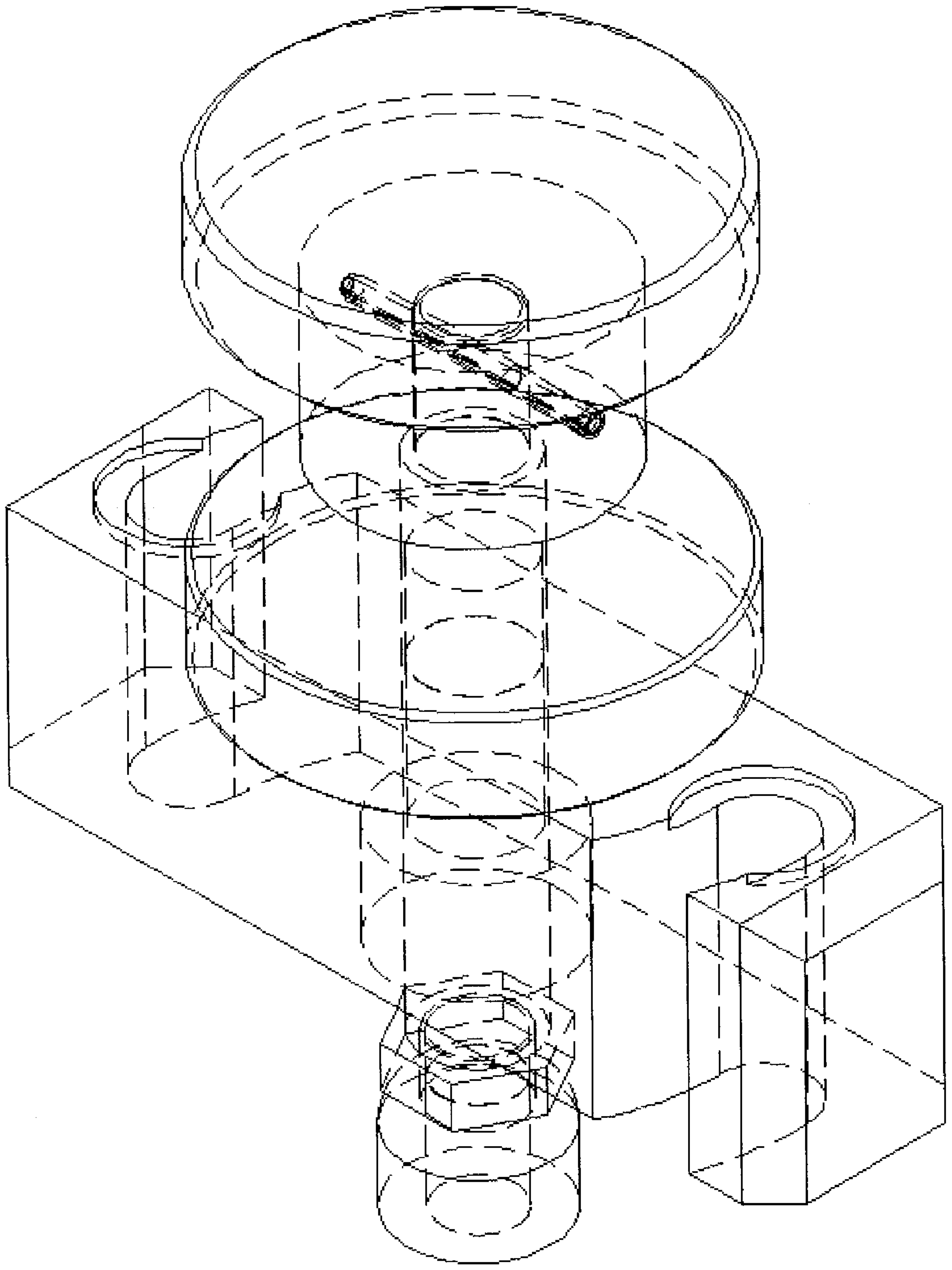
FIG. 22 is a perspective view of an embodiment of a bridge press used with the apparatus of FIG. 2.
Figure 23:
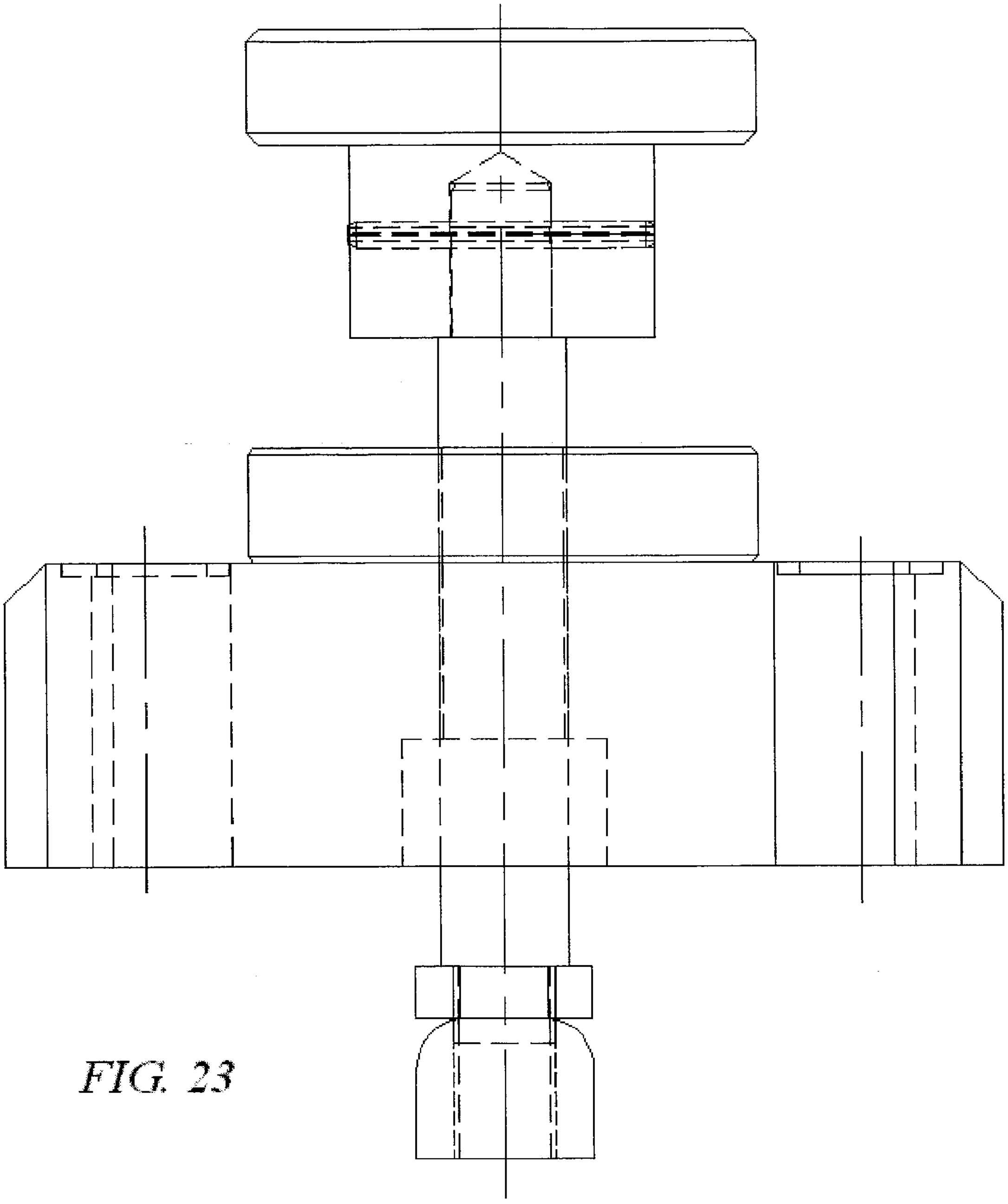
FIG. 23 is a front view of the bridge press.
Figure 24:
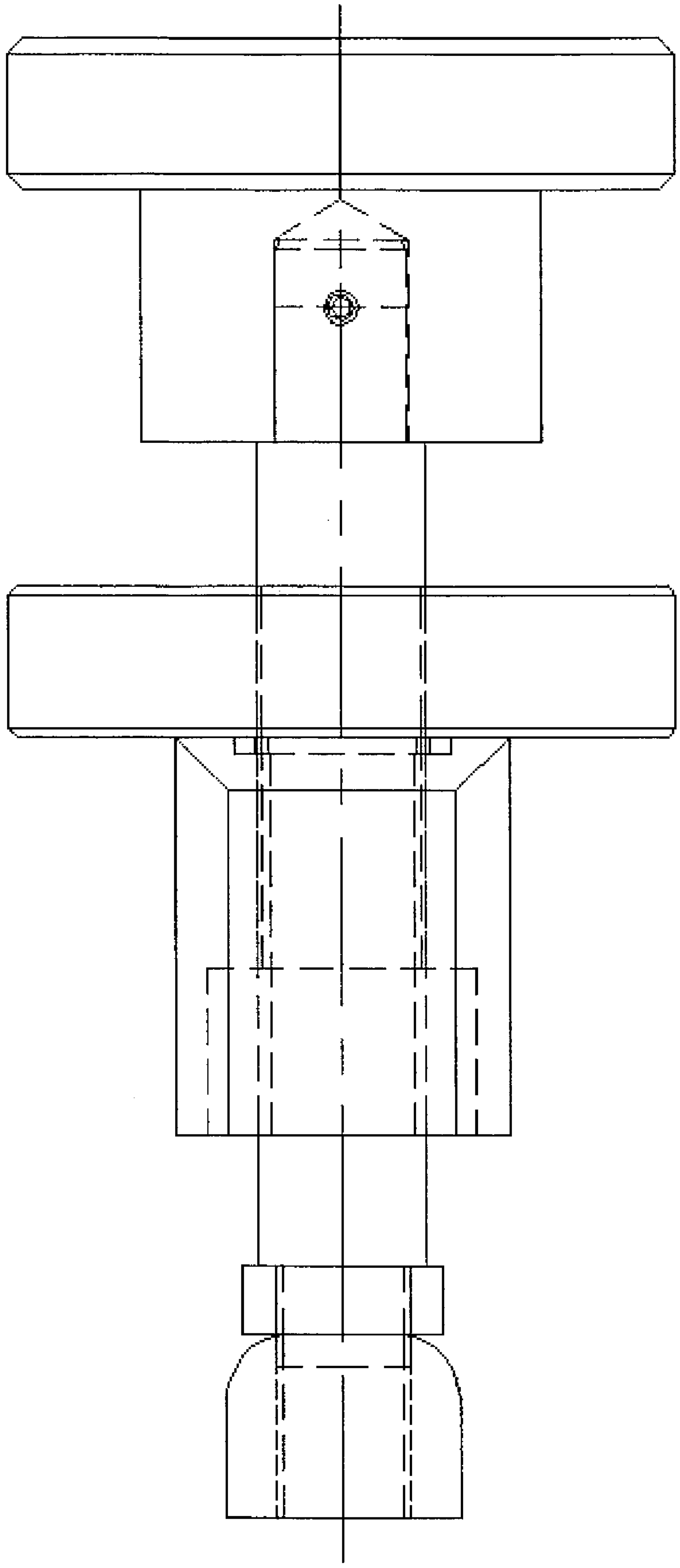
FIG. 24 is an end view of the bridge press.
Figure 25:
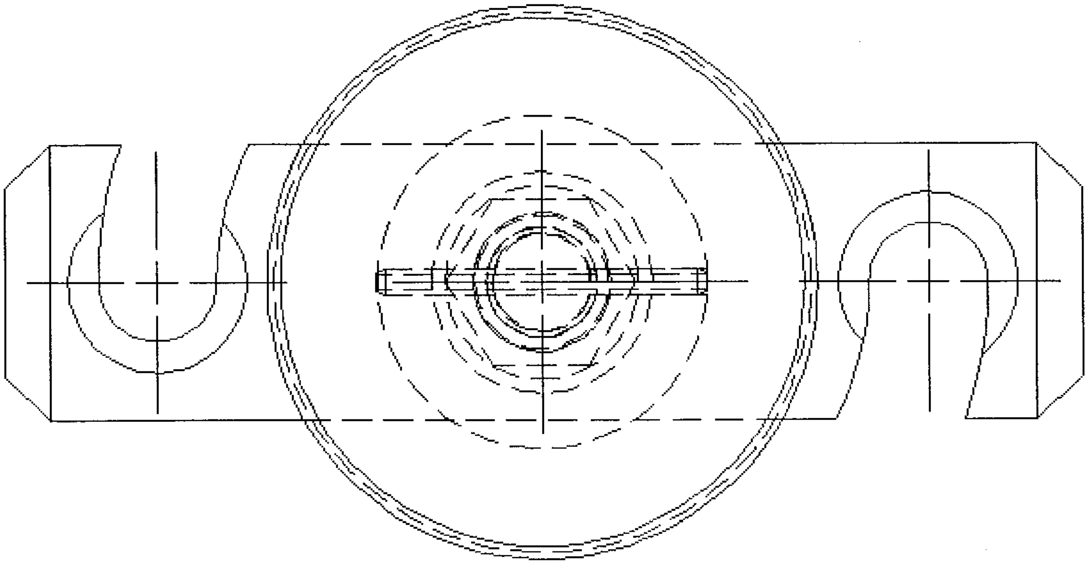
FIG. 25 is a top view of the bridge press.
Figure 26:
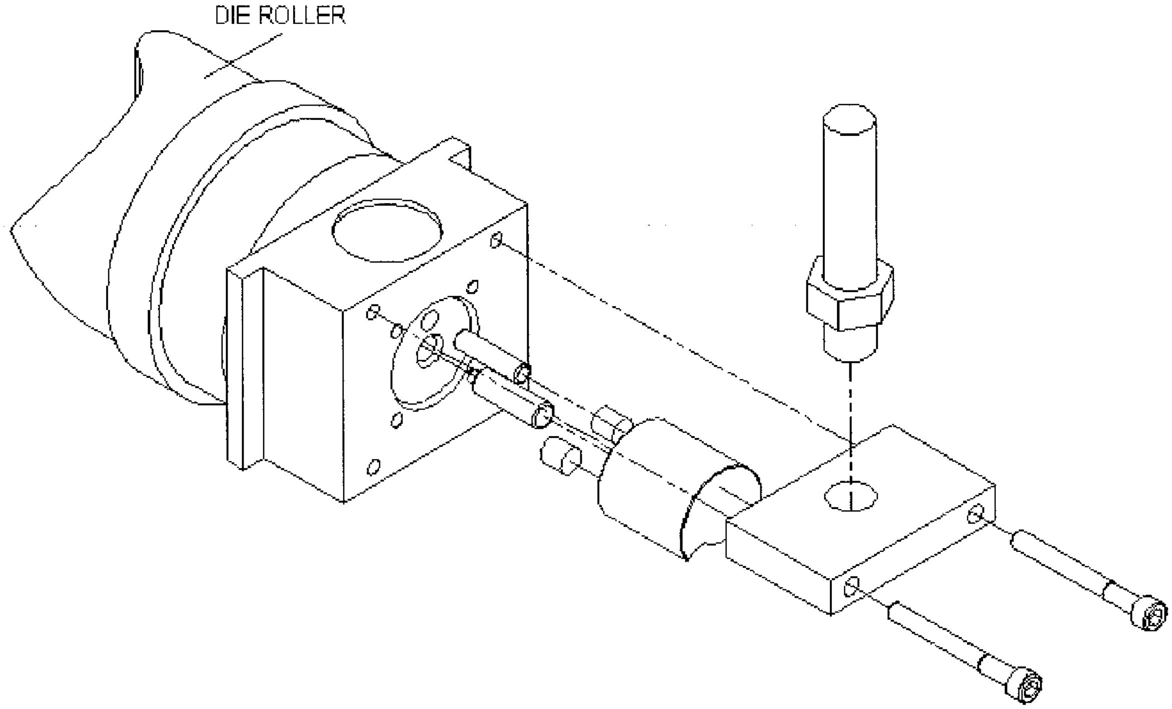
FIG. 26 is an exploded view of an embodiment of a die registration assembly used with the apparatus of FIG. 2.
Figure 27:
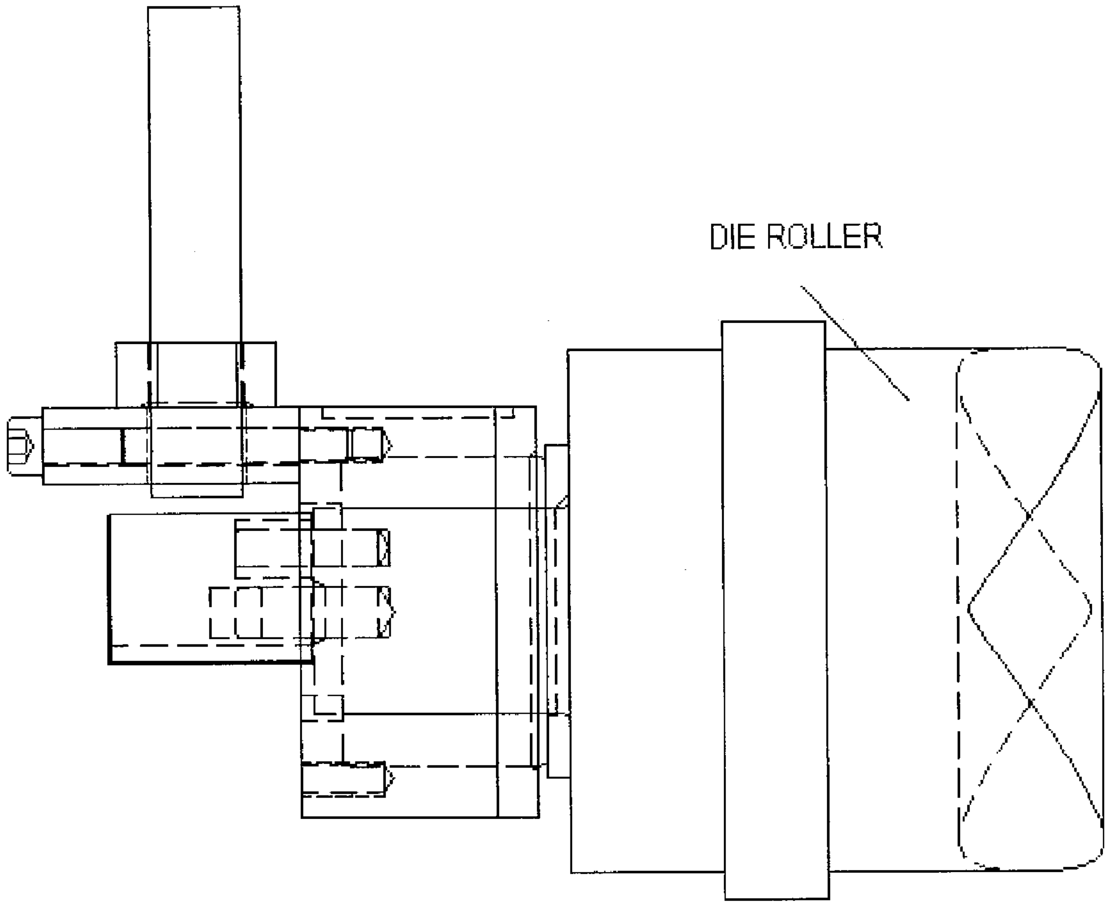
FIG. 27 is a front view of the die registration assembly.
Figure 28:
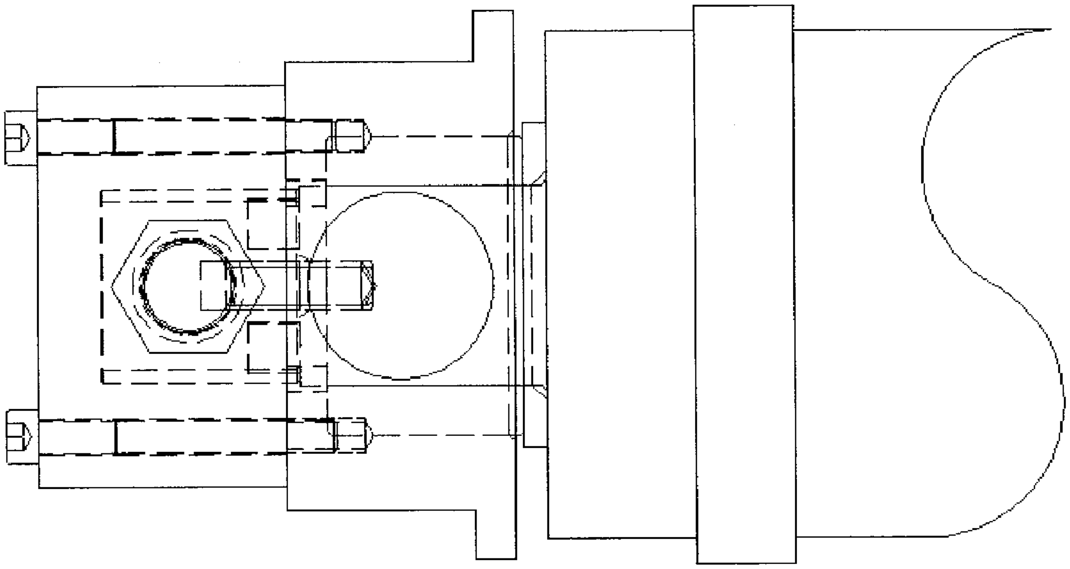
FIG. 28 is a top view of the die registration assembly.
Figure 29:
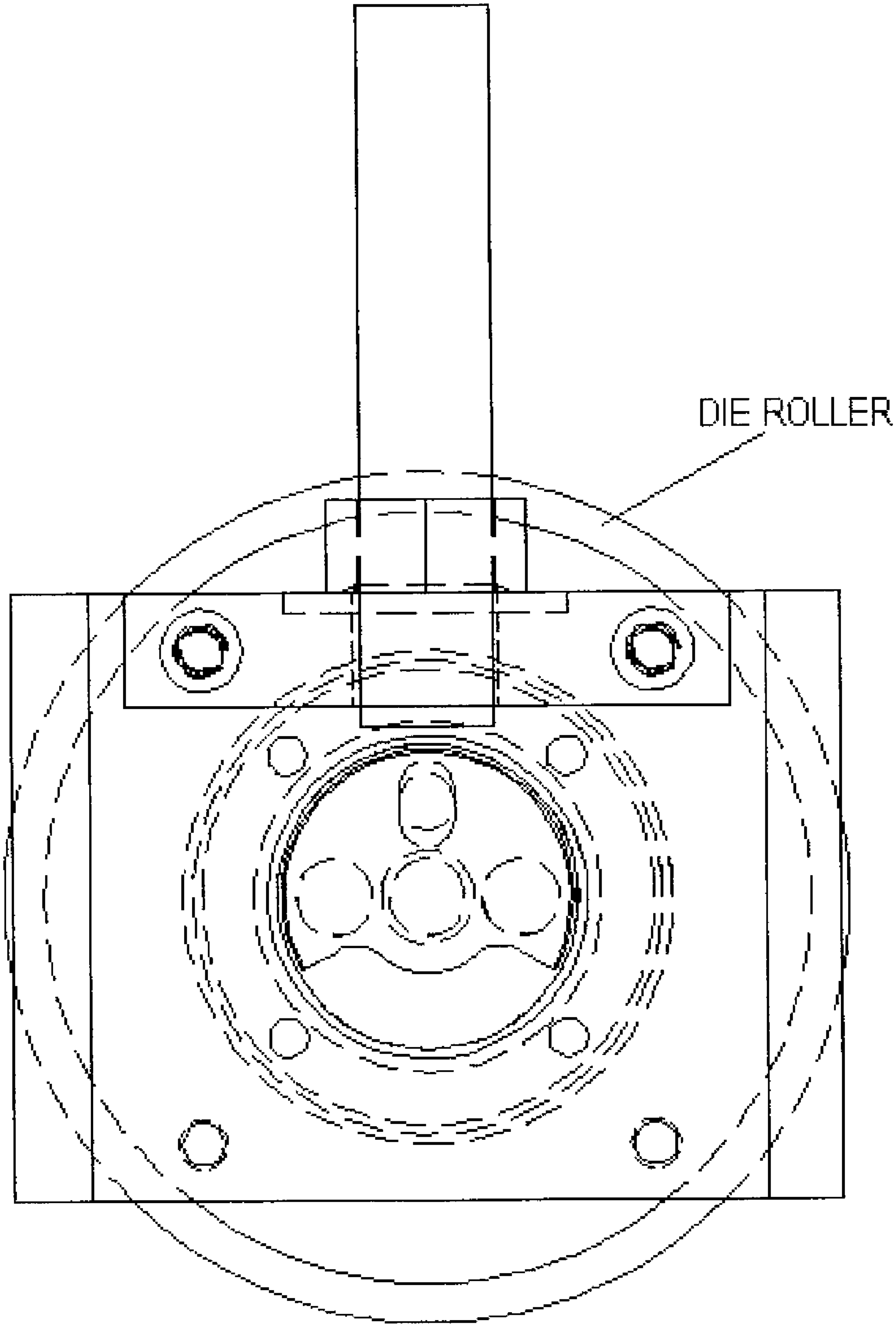
FIG. 29 is an end view of the die registration assembly.
Figure 30:
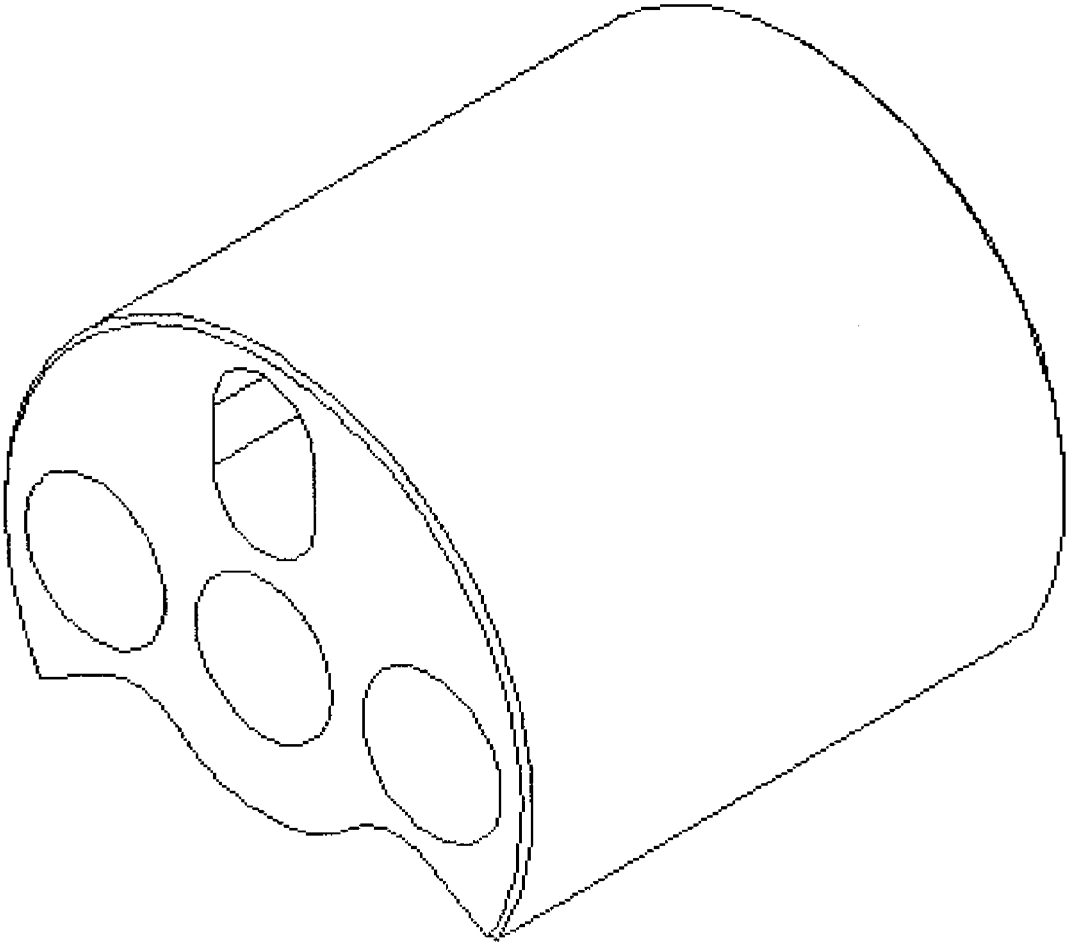
FIG. 30 is a perspective view of an embodiment of a die registration cam used with the die registration assembly.
Figure 31:
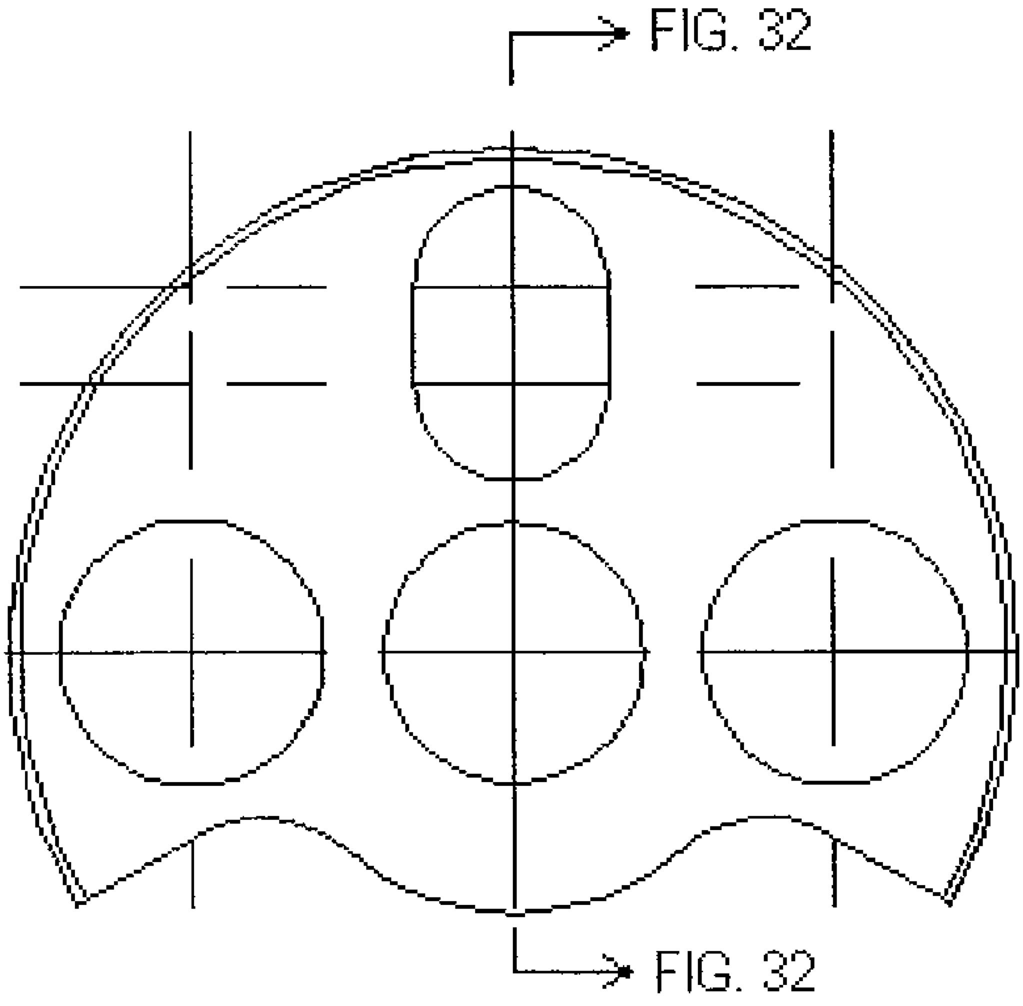
FIG. 31 is a front view of the die registration cam.
Figure 32:
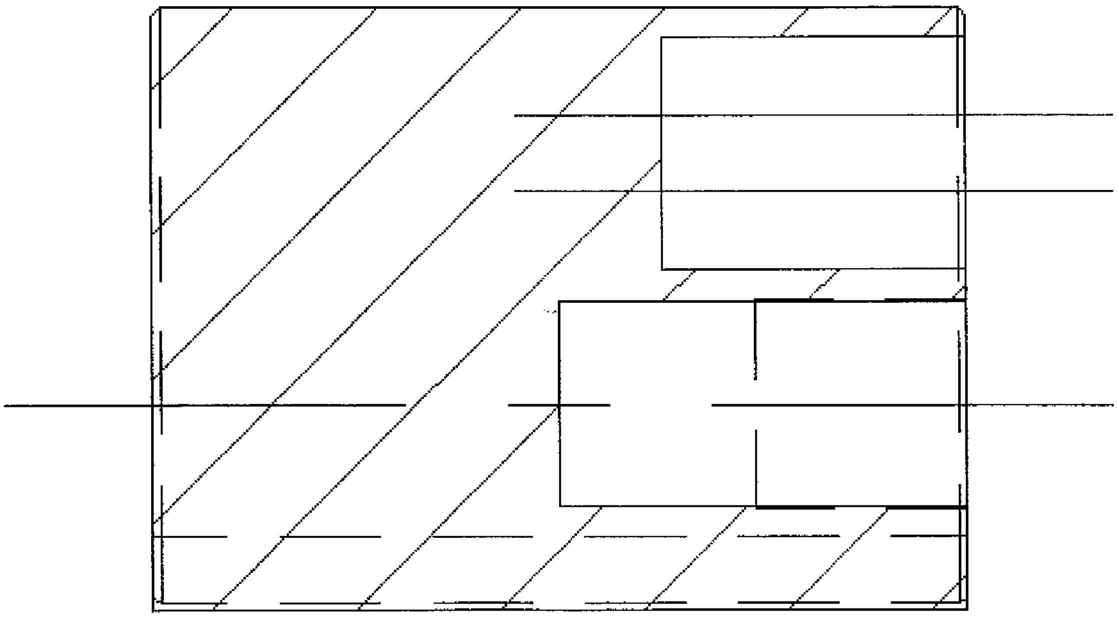
FIG. 32 is a crossectional view of the die registration cam taken along line A-A of FIG. 31.

Referring to FIGS. 1-32, embodiments of the invention are illustrated.

The basic structure of the apparatus of the invention comprise an anvil roller, a die roller communicatively associated with the vacuum roller, and a bump transfer roller communicatively associated with the anvil roller.

Preferably, a first web with repeating or non-repeating articles (such as labels or other material) spaced a first predetermined distance from each other, or unspaced, is communicatively coupled to the die roller via an infeed nip roller. The first web is cut with the die roller at the appropriate location or length. The first web cut parts are retained on the anvil roller by vacuum or an affinity for the anvil rollers surface a predetermined distance from each other.

A second web is communicatively associated with the anvil roller. Articles are transferred from the anvil roller to the second web by action of the bump transfer roller bringing the second web into communicative contact with the anvil roller. The articles are spaced on the second web a second predetermined distance from each other as a function of the speed of the second web, speed of the anvil roller and actuation of the bump transfer roller.

The second predetermined distance may be greater than the first predetermined distance. Alternatively, the second predetermined distance may be the less than, or the same as, the first predetermined distance.

The basic process for placing articles on a web, comprises the steps of providing a stream of articles on a first or input web at a first rate, placing the articles on the anvil roller at first predetermined distance from each other, moving anvil roller, moving a second or output web, and periodically bringing the second web into communicative association with the anvil roller whereby the articles are transferred to the second web.

The step of periodically bringing the second web into communicative association with the anvil roller is preferably accomplished by bumping the output web toward the anvil roller.

The articles are spaced on the output web a predetermined distance from each other.

Articles or parts may be cut from the first web at an appropriate location or length. The cut parts are held on the anvil roller the first predetermined distance from each other. The second web is moved and periodically brought into communicative association with the anvil roller whereby the cut parts are transferred to the second web at the first predetermined distance or a second, different predetermined distance.

Detailed structure and function of the apparatus and processes of the invention are shown in the drawings.

Various placement apparatus embodiments include an island placement assembly and a nip infeed assembly. The islance placement assembly includes an island placement frame, a die roller, an anvil roller, a bump transfer roller, and a servo motor. The island placement frame includes a first end plate and a second end plate. The island placement frame is sized to allow a first web and a second web to travel past the island placement frame between the first and second end plates of the frame. The die roller is mounted to and extends between the first and second end plates of the island placement frame. The anvil roller is mounted to and extends between the first and second ends of the island placement frame. The die roller and the anvil roller are adapted to cooperate to receive the first web and cut articles from the first web for transfer of the articles by the anvil roller to the second web. The bump transfer roller is mounted to and extends between the first and second ends of the island placement frame. The bump transfer roller has an axis of rotation, and is adapted to translationally move with respect to the first and second end plates between a first position for the axis of rotation and a second position of the axis of rotation. The anvil roller and the bump transfer roller are adapted to allow the second web to pass between the anvil roller and the bump transfer roller. The bump transfer roller is adapted to move the second web toward the anvil roller when the bump transfer roller moves from the first position to the second position. The servo motor is mechanically linked to the bump transfer roller to control translational motion of the bump transfer roller between the first position and the second position.

The nip infeed assembly includes a nip assembly frame, a first roller, a second roller, and a servo motor. The nip assembly frame includes a first end plate and a second end plate, and is connected to the island placement frame. The first roller extends between the first and second end plates of the nip assembly frame. The second roller extends between the first and second end plates of the nip assembly frame. The servo motor is mechanically linked to the first and second rollers to control motion of the first web to the die roller and the anvil roller.

The illustrated placement apparatus includes a first idler roller positioned on a first side of the bump transfer roller and a second idler roller positioned on a second side of the bump transfer roller to assist with travel of the second web between the bump transfer roller and the anvil roller. The illustrated placement apparatus also includes a first mounting clamp connected to the first end plate of the island placement frame and a second mounting clamp connected to the second end plate of the island placement frame for use in mounting the island placement frame to an automated converting machine.

In the illustrated placement apparatus, the bump transfer roller includes an eccentric shaft and a manual adjustment used to rotate the eccentric shaft to adjust the second position of the axis of rotation. The first end plate and the second end plate have a top end with an opening sized to top load the anvil roller and the die roller. The placement apparatus includes a first bridge press adapted to be connected to the top end of the first end plate and a second bridge press adapted to be connected to the top end of the second end plate. The first and second bridge presses are adapted to provide a manually-adjusted force to press the die roller against the anvil roller. In the illustrated placement apparatus, the anvil roller includes a vacuum anvil.

The descriptions above and the accompanying drawings should be interpreted in the illustrative and not the limited sense. While the invention has been disclosed in connection with an embodiment or embodiments thereof, it should be understood by those skilled in the art that there may be other embodiments which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A placement apparatus comprising: an island placement assembly, including:

an island placement frame including a first end plate and a second end plate, the island placement frame being sized to allow a first web and a second web to travel past the island placement frame between the first and second end plates of the island placement frame;

a die roller mounted to and extending between the first and second end plates of the island placement frame;

an anvil roller mounted to and extending between the first and second ends of the island placement frame, wherein the die roller and the anvil roller are adapted to cooperate to receive the first web and cut articles from the first web for transfer of the articles by the anvil roller to the second web;

a bump transfer roller mounted to and extending between the first and second ends of the island placement frame, the bump transfer roller having an axis of rotation, the bump transfer roller being adapted to translationally move with respect to the first and second end plates between a first position for the axis of rotation and a second position of the axis of rotation, wherein the anvil roller and the bump transfer roller are adapted to allow the second web to pass between the anvil roller and the bump transfer roller and the bump transfer roller is adapted to move the second web toward the anvil roller when the bump transfer roller moves from the first position to the second position; and a servo motor mechanically linked to the bump transfer roller to control translational motion of the bump transfer roller between the first position and the second position; and a nip infeed assembly, including:

a nip assembly frame including a first end plate and a second end plate, the nip assembly frame being connected to the island placement frame;

a first roller extending between the first and second end plates of the nip assembly frame;

a second roller extending between the first and second end plates of the nip assembly frame; and a servo motor mechanically linked to the first and second rollers to control motion of the first web to the die roller and the anvil roller.

2. The placement apparatus of claim 1, further comprising a first idler roller positioned on a first side of the bump transfer roller and a second idler roller positioned on a second side of the bump transfer roller to assist with travel of the second web between the bump transfer roller and the anvil roller.

3. The placement apparatus of claim 1, further comprising a first mounting clamp connected to the first end plate of the island placement frame and a second mounting clamp connected to the second end plate of the island placement frame for use in mounting the island placement frame to an automated converting machine.

4. The placement apparatus of claim 1, wherein the bump transfer roller includes an eccentric shaft and a manual adjustment used to rotate the eccentric shaft to adjust the second position of the axis of rotation.

5. The placement apparatus of claim 1, wherein the first end plate and the second end plate have a top end with an opening sized to top load the anvil roller and the die roller, the apparatus further comprising a first bridge press adapted to be connected to the top end of the first end plate and a second bridge press adapted to be connected to the top end of the second end plate, the first and second bridge presses being adapted to provide a manually-adjusted force to press the die roller against the anvil roller.

6. The placement apparatus of claim 1, wherein the anvil roller is a vacuum anvil roller.

* * * * *